(12) United States Patent
Nakayama et al.

(10) Patent No.: US 7,705,504 B2
(45) Date of Patent: *Apr. 27, 2010

(54) EMBEDDED MAGNET TYPE MOTOR

(75) Inventors: Takahiro Nakayama, Hamamatsu (JP); Yoshiyuki Takabe, Hamamatsu (JP); Keisuke Koide, Kosai (JP); Yoshihito Nishikawa, Toyohashi (JP)

(73) Assignee: ASMO Co., Ltd. (JP)

( * ) Notice: Subject to any disclaimer, the term of this patent is extended or adjusted under 35 U.S.C. 154(b) by 660 days.

This patent is subject to a terminal disclaimer.

(21) Appl. No.: 11/557,299

(22) Filed: Nov. 7, 2006

(65) Prior Publication Data
US 2007/0103024 A1 May 10, 2007

(30) Foreign Application Priority Data

| Nov. 7, 2005 | (JP) | 2005-322776 |
| Dec. 9, 2005 | (JP) | 2005-356253 |
| Dec. 21, 2005 | (JP) | 2005-368629 |
| Dec. 22, 2005 | (JP) | 2005-369591 |
| Apr. 21, 2006 | (JP) | 2006-118298 |
| Jun. 7, 2006 | (JP) | 2006-158804 |

(51) Int. Cl.
H02K 1/27 (2006.01)

(52) U.S. Cl. .............. 310/156.57; 310/156.53; 310/156.56

(58) Field of Classification Search .......... 310/156.38, 310/156.41, 156.43–156.49, 156.53, 156.56–156.57
See application file for complete search history.

(56) References Cited

U.S. PATENT DOCUMENTS

| 3,840,763 | A | * | 10/1974 | Baumann et al. | ....... | 310/156.56 |
| 6,031,311 | A | * | 2/2000 | Lee | ....... | 310/156.57 |
| 6,441,524 | B2 | * | 8/2002 | Kaneko et al. | ....... | 310/156.45 |
| 7,321,177 | B2 | * | 1/2008 | Uchida et al. | ....... | 310/216.019 |
| 2008/0265706 | A1 | * | 10/2008 | Nakayama et al. | ....... | 310/156.53 |
| 2009/0115280 | A1 | * | 5/2009 | Nakayama et al. | ....... | 310/156.53 |
| 2009/0230803 | A1 | * | 9/2009 | Nakayama et al. | ....... | 310/156.56 |

FOREIGN PATENT DOCUMENTS

| JP | 58-136258 | * | 8/1983 | ............ 310/156.56 |
| JP | 08-256441 | | 10/1996 | |
| JP | 2002-359941 | | 12/2002 | |
| JP | 2005-051982 | | 2/2005 | |

* cited by examiner

Primary Examiner—Tran N Nguyen
(74) Attorney, Agent, or Firm—Sheridan Ross P.C.

(57) ABSTRACT

A rotor of an embedded magnet type motor has a plurality of magnets forming magnetic poles, the number of which is represented by P. A rotor core includes first accommodation holes, the number of which is represented by P/2, extending in a radial direction, and V-shaped accommodation holes, the number of which is represented by P/2, having a V shape protruding outward in a radial direction. The first accommodation holes and the V-shaped accommodation holes are alternately arranged in a circumferential direction. The V-shaped accommodation holes include a second accommodation hole and a third accommodation hole corresponding to two straight lines forming the V shape. The first accommodation hole is adjacent to the second accommodation hole at one side in the circumferential direction, and is adjacent to the third accommodation hole at the other side. A plurality of magnets include a first magnet arranged in the first accommodation hole, a second magnet arranged in the second accommodation hole, and a third magnet arranged in the third accommodation hole. The first magnet and the second magnet form one magnetic pole. The first magnet and the third magnet form another magnet pole. Accordingly, it is possible to achieve a high torque while suppressing an increase of the number of parts of the embedded magnet type motor.

39 Claims, 27 Drawing Sheets

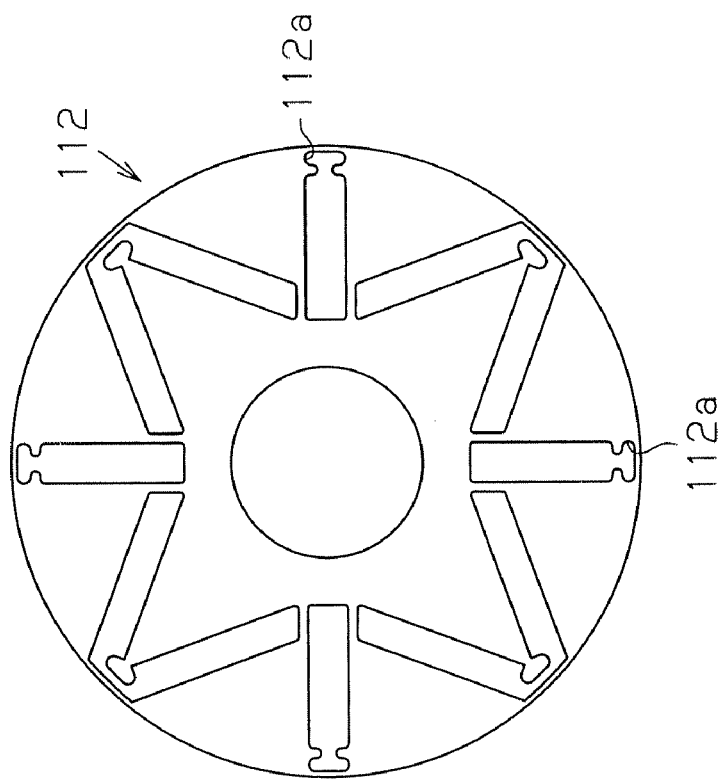
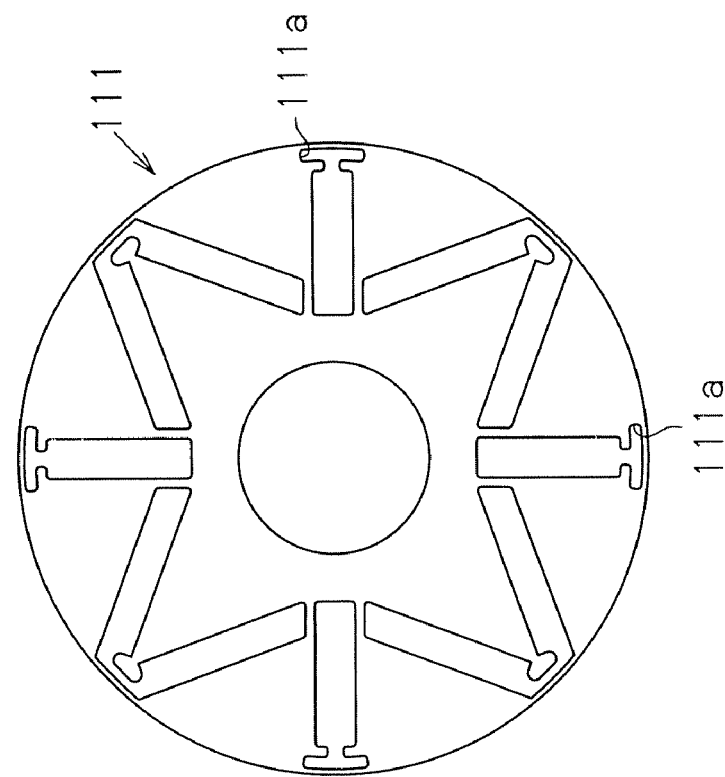

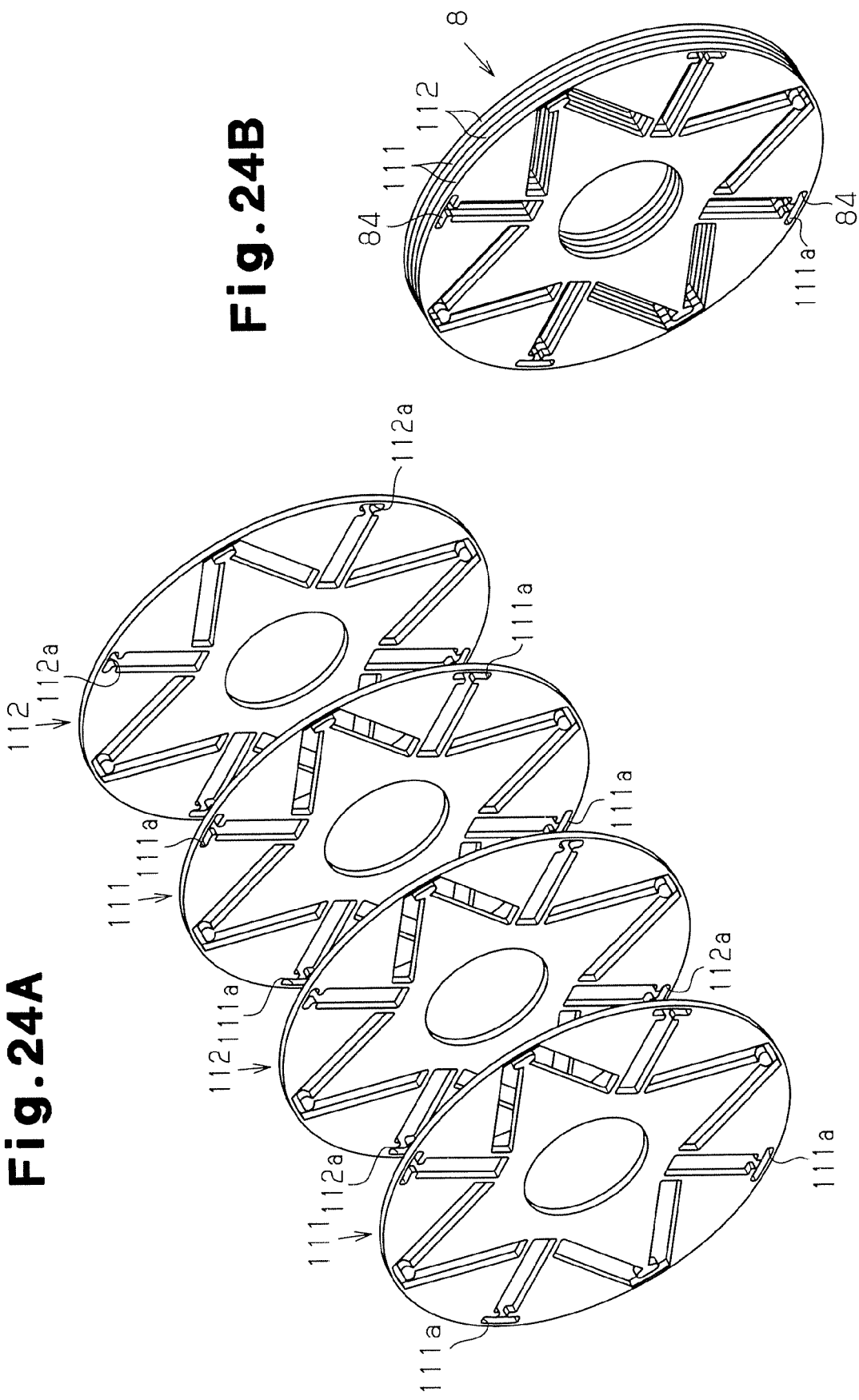

EMBEDDED MAGNET TYPE MOTOR

BACKGROUND OF THE INVENTION

The present invention relates to an embedded magnet type motor.

Conventionally, a rotor core of an embedded magnet type motor has a plurality of accommodation holes accommodating a plurality of magnets. A plurality of magnets are distributed in a circumferential direction of the rotor core. Each of the accommodation holes passes through the rotor core in an axial direction.

An embedded magnet type motor disclosed in Japanese Laid-Open Patent Publication No. 2005-51982 has plural pairs of magnets arranged so as to form a V shape. The V shape projects inward in a radial direction. Each pair of the magnets form one magnetic pole. In other words, in the case that the number of the magnetic poles of the embedded magnet type motor is represented by P, the number of magnets required in the whole of the motor is represented by 2P. In this case, for example, in comparison with a motor in which curved or linear magnets are arranged simply along a circumferential direction, a greater number of magnets can be used, and it is possible to achieve a high torque.

However, in the embedded magnet type motor having magnets, the number of which is represented by 2P, the number of parts is increased, and a parts management cost and an assembling cost may be increased.

The embedded magnet type motor in the publication mentioned above has a plurality of outer bridges defined between an outer end in a radial direction of each of the accommodation holes for accommodating the magnet, and an outer circumferential surface of the rotor core. Two outer bridges are provided in one magnetic pole. Accordingly, a leakage flux passing through the outer bridge is too much for the entire motor. As a result, an effective magnetic flux of the embedded magnet type motor is reduced, and a high torque cannot be obtained.

SUMMARY OF THE INVENTION

An objective of the present invention is to provide an embedded magnet type motor generating a high torque while suppressing an increase of the number of parts.

In accordance with one aspect of the present invention, an embedded magnet type motor provided with a rotor is provided. The rotor has a rotor core having an axis, and a plurality of magnets forming magnetic poles, the number of which is represented by P. The rotor core has a plurality of accommodation holes arranged over a circumferential direction of the rotor core. The accommodation holes pass through the rotor core in the axial direction. The accommodation holes include first accommodation holes, the number of which is represented by P/2, extending in a radial direction of the rotor core, and V-shaped accommodation holes, the number of which is represented by P/2, having a projecting V shape in an outer side in the radial direction. The first accommodation holes and the V-shaped accommodation holes are arranged alternately in a circumferential direction. The V-shape accommodation holes include second accommodation holes and third accommodation holes corresponding to two straight lines forming a V shape. Each first accommodation hole is adjacent to a second accommodation hole at one side in the circumferential direction, and is adjacent to a third accommodation hole at the other side. A plurality of magnets include first magnets arranged in the first accommodation holes, second magnets arranged in the second accommodation holes, and third magnets arranged in the third accommodation holes. Each first magnet and the corresponding one of the second magnets form one magnetic pole. Each first magnet and the corresponding one of the third magnets form another magnetic pole.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention, together with objects and advantages thereof, may best be understood by reference to the following description of the presently preferred embodiments together with the accompanying drawings in which:

FIG. 1A is a partial enlarged view of an inner end in a radial direction of a first accommodation hole shown in FIG. 1;

FIG. 5A is a partial enlarged view of an inner end in a radial direction of a first accommodation hole shown in FIG. 5;

FIG. 9A is a partial enlarged view of an inner end in a radial direction of a first accommodation hole shown in FIG. 9;

FIG. 23A is a plan view of a core sheet of another modification;

FIG. 23B is a plan view of a core sheet different from that in FIG. 23A;

FIG. 24A is an exploded perspective view of a rotor core including the core sheet in FIG. 23A and the core sheet in FIG. 23B;

FIG. 24B is a perspective view of a rotor core in which a plurality of core sheets in FIG. 24A are laminated;

DETAILED DESCRIPTION OF BEST MODE

Figure 1:
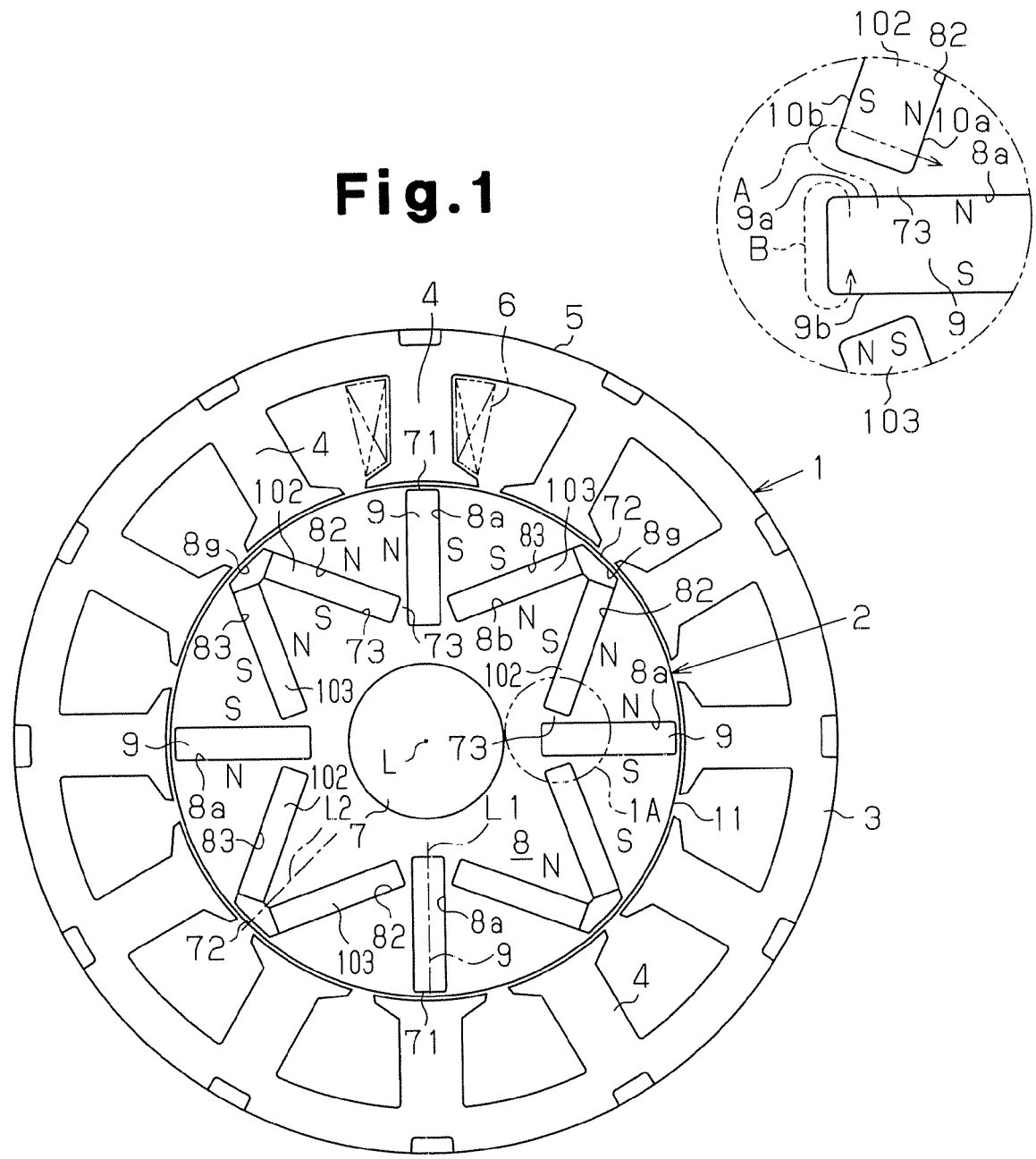
FIG. 1 is a plan view of an embedded magnet type motor in accordance with a first embodiment of the present invention.

A description will be given below of an embodiment of the present invention with reference to FIGS. 1 and 2. As shown in FIG. 1, an embedded magnet type motor is provided with a stator 1 and a rotor 2.

The stator 1 is formed in a cylindrical shape as a whole. The stator 1 is provided with a stator core 5 and a plurality of coils 6. The stator core 5 has a cylinder portion 3 forming an outer shape, and a plurality of teeth 4 arranged at a uniform angular interval in a circumferential direction of the stator 1 in an inner circumferential surface of the cylinder portion 3. Each of the teeth 4 extends toward an axis L of the stator 1 from an inner circumferential surface of the cylinder portion 3. Each of a plurality of coils 6 is wound around the corresponding teeth 4 via an insulator (not shown) by means of concentrated winding. FIG. 1 only shows one coil 6 by a two-dot chain line. The stator core 5 in accordance with the present embodiment has twelve teeth 4.

Figure 2:
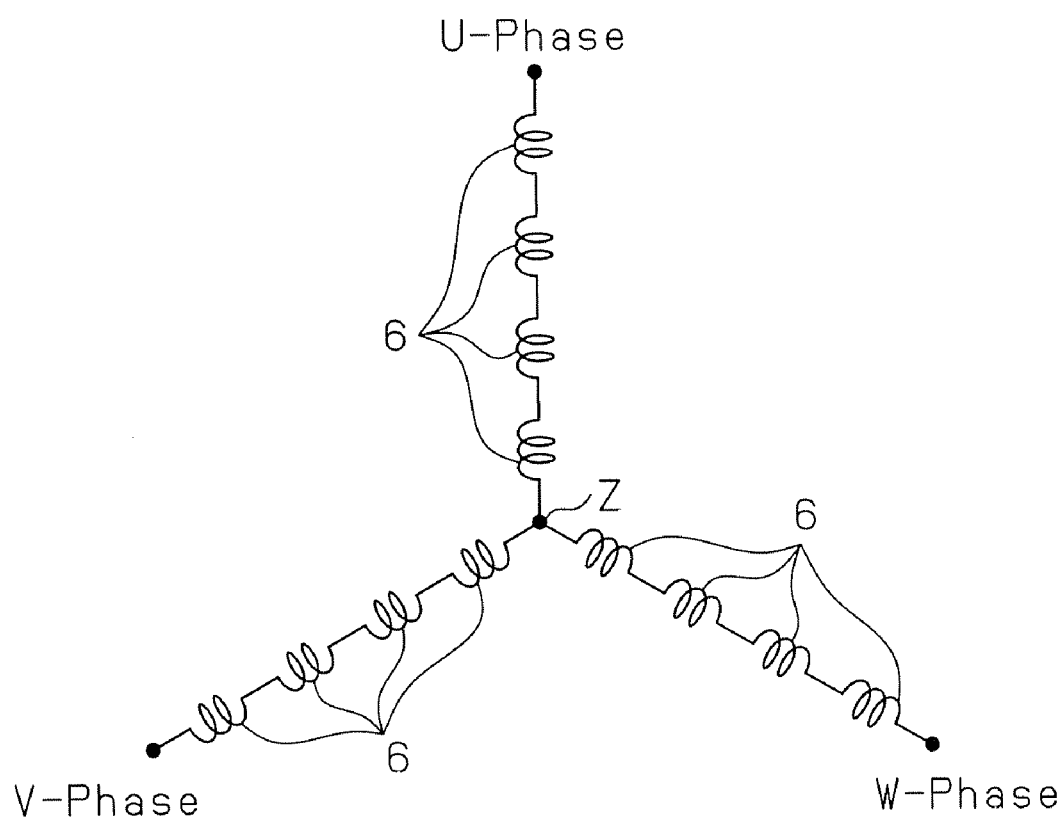
FIG. 2 is a connection diagram of a coil in the motor in FIG. 1.

As shown in FIG. 2, the stator 1 has totally three conducting wires respectively corresponding to U-phase, V-phase and W-phase. Each of the conducting wires forms four coils 6. In other words, four conducting wires are connected in series. The U-phase coils 6 are provided in the stator 1 so as to be spaced by two of the teeth 4. The V-phase coils 6 are provided in adjacent to the U-phase coil 6 in the stator 1 so as to be spaced by two of the teeth 4. One end of each of the three conducting wires is connected to a common neutral point Z. An alternating current having a phase difference of 120 degrees is supplied to the other end of each of the three conducting wires.

The rotor 2 is provided with a rotary shaft 7, a rotor core 8 fixed to the rotary shaft 7, first magnets 9, the number of which is represented by P/2, second magnets 102, the number of which is represented by P/2, and third magnets 103, the number of which is represented by P/2. A number of magnetic poles of the rotor 2 is set to eight in the present embodiment. The second magnet 102 has the same shape as that of the third magnet 103.

The rotor core 8 is formed in a columnar shape. The rotor core 8 includes a plurality of core sheets 11 laminated in an axial direction. The rotor core 8 has a center hole to which the rotary shaft 7 is fitted and attached. The rotor core 8 is rotatably supported in an inner side of the stator 1.

The rotor core 8 has first accommodation holes 8a, the number of which is represented by P/2, and V-shaped accommodation holes 8b, the number of which is represented by P/2. Each first accommodation hole 8a accommodates a first magnet 9. Each V-shaped accommodation hole 8b accommodates a second magnet 102 and a third magnet 103. The first accommodation holes 8a correspond to accommodation holes in a radial direction extending in a radial direction. The V-shape shaped accommodation holes 8b have a V shape projecting outward in the radial direction. Dimensions in an axial direction of each first magnet 9, each second magnet 102, and each third magnet 103 are set to be the same as a dimension in the axial direction of the rotor core 8. The first accommodation holes 8a are symmetrical with a center axis with respect to a circumferential direction, that is, a first center line L1 corresponding to a center in the circumferential direction. The V-shaped accommodation holes 8b are symmetrical with a second center line L2 corresponding to a center in the circumferential direction.

The first accommodation holes 8a and the V-shaped accommodation holes 8b pass through the rotor core 8 in the axial direction. The first accommodation holes 8a and the V-shape accommodation holes 8b are arranged alternately in the circumferential direction, and at a uniform angular interval. The width of each first accommodation hole 8a, that is, the dimension in a direction perpendicular to a direction in which the first accommodation hole 8a extends, is constant as seen from the axial direction.

Each V-shaped accommodation hole 8b in accordance with the present embodiment has a second accommodation hole 82, a third accommodation hole 83 and a top portion 8g. The second accommodation hole 82 and the third accommodation hole 83 serving as the magnet accommodating portion correspond to two straight lines forming the V shape of the V-shaped accommodation hole 8b. The top portion 8g connects an outer end in a radial direction of the second accommodation hole 82 with an outer end in a radial direction of the third accommodation hole 83. In the present embodiment, the second accommodation hole 82 and the third accommodation hole 83 extend linearly as seen from an axial direction, and have a constant width over a radial direction. An angle between the second accommodation hole 82 and the third accommodation hole 83 is 50 degrees. The first accommodation hole 8a is adjacent to the second accommodation hole 82 at one end in the circumferential direction, that is, in a counterclockwise direction, and is adjacent to the third accommodation hole 83 in the other end, that is, in a clockwise direction. The second accommodation hole 82 and the third accommodation hole 83 are symmetrical with respect to a center line in the circumferential direction of the V-shaped accommodation hole 8b. In other words, the second accommodation hole 82 and the third accommodation hole 83 are symmetrical with respect to the first accommodation hole 8a.

As shown in FIG. 1A, an inner end in the radial direction of each second accommodation hole 82 in the present embodiment faces a side surface extending in the radial direction, in an inner end in the radial direction of the first accommodation hole 8a. In the same manner, an inner end in the radial direction of each third accommodation hole 83 faces a side surface extending in the radial direction in the inner end in the radial direction of the first accommodation hole 8a as seen from the axial direction, in the same manner. In the present embodiment, an angle between the first accommodation hole 8a and the second accommodation hole 82 is 70 degrees, and an angle between the first accommodation hole 8a and the third accommodation hole 83 is also 70 degrees. The inner end in the radial direction of the first accommodation hole 8a is positioned in more inward in the radial direction of the inner end in the radial direction of the second accommodation hole 82 and the inner end in the radial direction of the third accommodation hole 83.

As shown in FIG. 1A, each first magnet 9 has a first magnetic flux outflow surface 9a from which a magnetic flux flows out, and a first magnetic flux inflow surface 9b to which the magnetic flux flows in. An inner end in a radial direction of the second magnet 102 has a second magnetic flux outflow surface 10a from which the magnetic flux flows out, and a second magnetic flux inflow surface 10b to which the magnetic flux flows in. FIG. 1A shows a first magnetic flux line A by a two-dot chain line, and a second magnetic flux line B by a broken line. The first magnetic flux line A shows the magnetic flux flowing out from an N pole of the first magnet 9 and flowing in to an S pole of the second magnet 102. In other words, the first magnetic flux line A flows out from the first magnetic flux outflow surface 9a, and flows in to the second magnetic flux inflow surface 10b. The second magnetic flux line B shows a leakage flux flowing out from the N pole of the first magnet 9 and directly oriented toward the S pole of the first magnet 9 itself. In other words, the second magnetic flux line B flows out from the first magnetic flux outflow surface 9a and flows in to the first magnetic flux inflow surface 9b.

The rotor core 8 has first outer bridges 71, the number of which is represented by P/2, second outer bridges 72, the number of which is represented by P/2, and inner bridges 73, the number of which is represented by P. The first outer bridge 71 is defined between an outer end in the radial direction of the first accommodation hole 8a, and an outer circumferential surface of the rotor core 8. The second outer bridge 72 is defined between the outer end in the radial direction of the V-shaped accommodation hole 8b, that is, the top portion 8g, and the outer circumferential surface of the rotor core 8. The inner bridge 73 is defined between the inner end in the radial direction of the V-shaped accommodation hole 8b, and the first accommodation hole 8a.

The first accommodation hole 8a accommodates the first magnet 9, the second accommodation hole 82 accommodates the second magnet 102, and the third accommodation hole 83 accommodates the third magnet 103. Each of the first magnet 9 to the third magnet 103 has a rectangular parallelepiped shape. As shown in FIG. 1, each of the first magnet 9 to the third magnet 103 has a rectangular shape as seen from the axial direction.

In each of the first magnet 9 to the third magnet 103, a surface corresponding to one long side of a pair of long sides of the rectangle indicates the N pole, and a surface corresponding to the other long side indicates the S pole. The N pole of the first magnet 9 and the N pole of the second magnet 102 form one magnet pole, that is, the N pole of the rotor 2. The S pole of the first magnet 9 and the S pole of the third magnet 103 form one different magnetic pole, that is, the S pole of the rotor 2.

A surface in a counterclockwise direction side of the first magnet 9 indicates the N pole, and a surface in a clockwise direction side indicates the S pole. A surface in a counterclockwise direction side of the second magnet 102 indicates the S pole, and a surface in a clockwise direction side indicates the N pole. A surface in a counterclockwise direction side of the third magnet 103 indicates the S pole, and a surface in a clockwise direction side indicates the N pole.

The embodiment mentioned above has the following advantages.

(1) One first magnet 9 accommodated in each first accommodation hole 8a forms a part of the N pole and a part of the S pole of the rotor 2. The first magnet 9 is adjacent to the N pole of a second magnet 102 in the counterclockwise direction side of the rotor core 8, and is adjacent to the S pole of a third magnet 103 in the clockwise direction side. In other words, the first magnet 9 is commonly used for two magnetic poles of the rotor core 8.

Accordingly, in the case that the number of the magnetic poles the rotor core 8 is represented by P, the rotor core 8 has first magnets 9, the number of which is represented by P/2, second magnets 102, the number of which is represented by P/2, and third magnets 103, the number of which is represented by P/2. In other words, the rotor core 8 in accordance with the present embodiment has magnets, the number of which is represented by (3/2)P. For example, P=8 and (3/2)P=12.

In contrast, the whole of the rotor core of the conventional embedded type motor requires magnets, the number of which is represented by 2P. Accordingly, the present embodiment can reduce the number of the magnets. As a result, it is possible to reduce the number of parts, and it is further possible to reduce a parts management cost and an assembling cost.

Each first accommodation hole 8a is commonly used for two magnetic poles. A first outer bridge 71 between the outer end in the radial direction of the first accommodation hole 8a and the outer circumferential surface of the rotor core 8 is commonly used for two magnetic poles. Accordingly, it is possible to reduce the number of the outer bridges in the rotor core 8, and it is possible to reduce the leakage flux passing through the outer bridge.

In the present embodiment, the first magnet 9 to the third magnet 103 are arranged in such a manner as to show an alternately arranged VI pattern. Accordingly, it is possible to use a lot of magnets and it is possible to generate a high torque, in comparison with the case that the curved magnets or the liner magnets are arranged in the rotor core simply along a circumferential direction.

(2) The top portion 8g of each V-shaped accommodation hole 8b is a space for connecting an outer end in the radial direction of a second accommodation hole 82 with an outer end in the radial direction of a third accommodation hole 83. Accordingly, the top portion 8g prevents the leakage flux flowing out from the N pole of the second magnet 102 and immediately oriented to the S pole of the second magnet 102 itself, in the outer end in the radial direction of the second accommodation hole 82. In the same manner, the top portion 8g prevents the leakage flux flowing out from the N pole of the third magnet 103 and immediately oriented to the S pole of the third magnet 103 itself, in the outer end in the radial direction of the third accommodation hole 83.

(3) An inner end in the radial direction of each second accommodation hole 82 faces the first magnetic flux outflow surface 9a of a first magnet 9. In other words, the first magnetic flux outflow surface 9a of the first magnet 9 approaches the second magnetic flux inflow surface 10b of the second magnet 102. Accordingly, the magnetic flux of the first magnetic flux line A oriented to the second magnetic flux inflow surface 10b from the first magnetic flux outflow surface 9a is increased. The leakage flux shown by the second magnetic flux line B is reduced. In other words, the effective magnetic flux in the rotor core 8 is increased.

(4) The width of each first accommodation hole 8a is constant over the radial direction as seen from the axial direction. A first magnet 9 accommodated in the first accommodation hole 8a is formed in a rectangular parallelepiped shape. Accordingly, the first magnet 9 is formed in a simple shape, for example, in comparison with a trapezoidal magnet as seen from the axial direction.

(5) Each of the second accommodation hole 82 and the third accommodation hole 83 extends linearly as seen from the axial direction. Each of the second accommodation hole 82 and the third accommodation hole 83 has a constant width. Each of the second magnet 102 accommodated in the second accommodation hole 82 and the third magnet 103 accommodated in the third accommodation hole 83 is formed in a rectangular parallelepiped shape. Accordingly, the second magnet 102 and the third magnet 103 are formed in a simple shape, for example, in comparison with the curve-shaped magnet.

A description will be given below of a second embodiment of the present invention with reference to FIGS. 3 and 4.

Figure 3A:
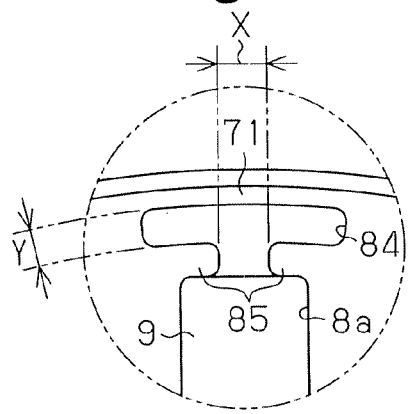
FIG. 3A is a partial enlarged view of an outer end in a radial direction of a first accommodation hole shown in FIG. 3.
Figure 3B:
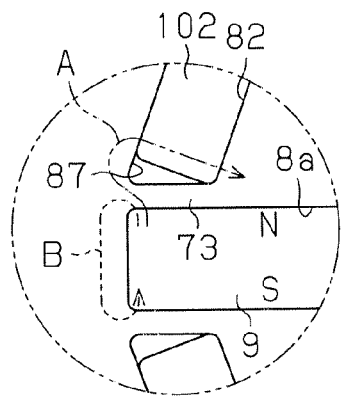
FIG. 3B is a partial enlarged view of an inner end in the radial direction of the first accommodation hole shown in FIG. 3.
Figure 3:
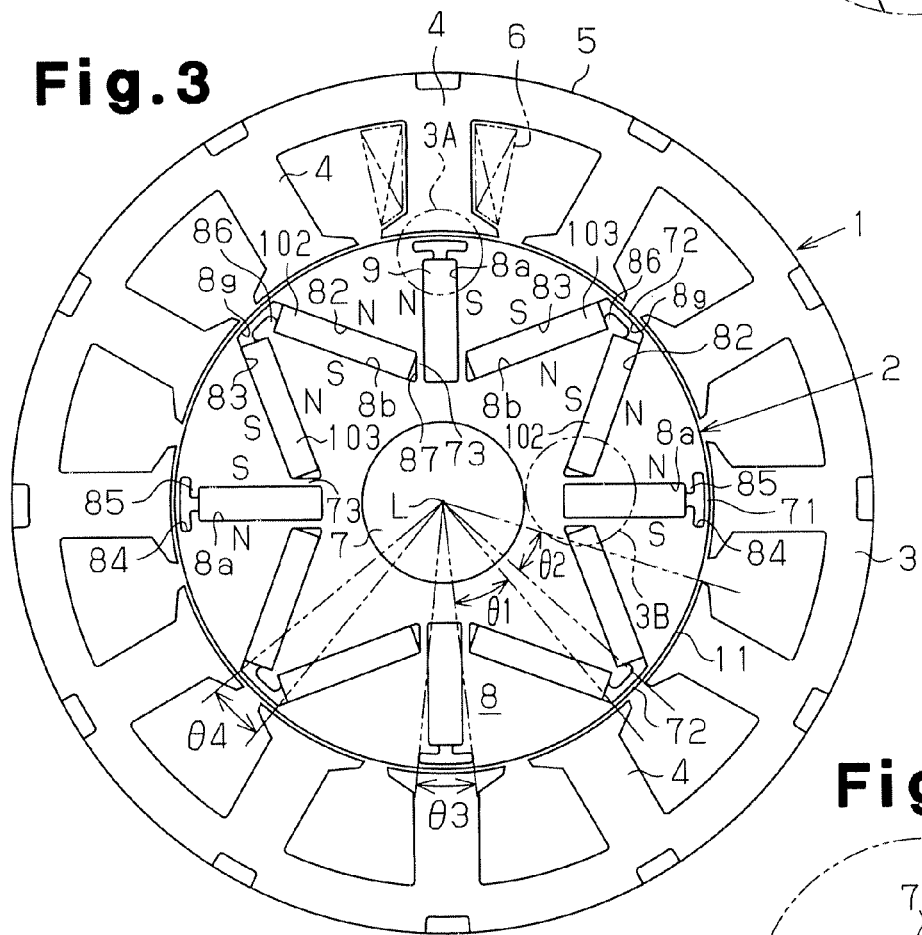
FIG. 3 is a plan view of an embedded magnet type motor in accordance with a second embodiment of the present invention.

As shown in FIG. 3, a rotor core 8 in accordance with the second embodiment has a large-width portion 84 provided in an outer end in a radial direction of each first accommodation hole 8a. As shown in FIG. 3A, the large-width portion 84 serving as a space has a larger width than a width of the first accommodation hole 8a as seen from an axial direction. The width of the large-width portion 84 indicates a dimension in a vertical direction to an extending direction of the first accommodation hole 8a, that is, a dimension in a vertical direction to the radial direction. The large-width portion 84 of the present embodiment passes through the whole of the rotor core 8 in the axial direction.

The rotor core 8 has a pair of first protrusion portions 85 per each of the first accommodation holes 8a. The first protrusion portions 85 define the large-width portions 84 with respect to the first accommodation holes 8a. In other words, each pair of the first protrusion portions 85 is positioned between a first accommodation hole 8a and a large-width portion 84. The first protrusion portion 85 regulates a movement outward in the radial direction of the first magnet 9. The first protrusion portion 85 protrudes in a vertical direction to the radial direction. Accordingly, a distance between a pair of first protrusion portions 85, that is, a width X between the first accommodation hole 8a and the large-width portion 84 becomes smaller than the width of the first accommodation hole 8a. The width X of the large-width portion 84 is set larger than a dimension Y in the radial direction of the large-width portion 84. A pair of first protrusion portions 85 are symmetrical with respect to a line. In other words, a pair of first protrusion portions 85 protrude at the same amount from both walls in the circumferential direction of the first accommodation hole 8a.

Figure 4:
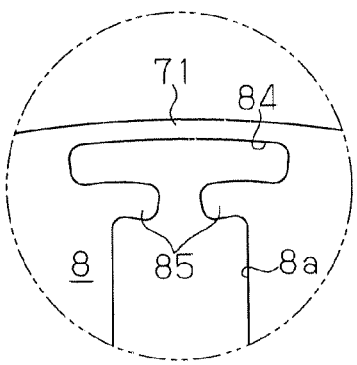
FIG. 4 is a partial enlarged view of a protrusion portion in the motor in FIG. 3.

As shown in FIG. 4, a leading end of the first protrusion portion 85 is slightly inclined toward an inner side in the radial direction, before the first magnet 9 is accommodated in the first accommodation hole 8a. Accordingly, since the first magnet 9 is accommodated in the first accommodation hole 8a in a state of being exposed to a restoring force of the first protrusion portion 85, the first magnet 9 is readily and securely fixed to the first accommodation hole 8a.

As shown in FIG. 3, a pair of second protrusion portions 86 protruding in a circumferential direction are formed in an outer end in the radial direction of the V-shaped accommodation hole 8b. The second protrusion portions 86 regulate a movement outward in the radial direction of the second magnet 102 and the third magnet 103. As a result, the second protrusion portions 86 prevent the second magnet 102 from being brought into contact with or coming into collision with the third magnet 103 in the V-shaped accommodation hole 8b.

As shown in FIG. 3, a first angular width $\theta 1$ indicates an angular width between the large-width portion 84 and the outer end in the radial direction of the top portion 8g. A second angular width $\theta 2$ indicates an angular width of an inner end in the radial direction of each of the teeth 4. A third angular width $\theta 3$ indicates an angular width of the large-width portion 84. A fourth angular width $\theta 4$ indicates an angular width of an outer end in the radial direction of the top portion 8g. The first angular width $\theta 1$ is set to be larger than the second angular width $\theta 2$. The third angular width $\theta 3$ is set to be equal to the fourth angular width $\theta 4$. The third angular width $\theta 3$ is set to be smaller than the second angular width $\theta 2$.

As shown in FIG. 3B, an extension portion 87 formed in a triangular shape as seen from the axial direction extends from an inner end in the radial direction of the second accommodation hole 82, and an inner end in the radial direction of the third accommodation hole 83. The extension portion 87 makes a width of the inner bridge 73 constant over the radial direction.

The first outer bridge 71 is positioned between the large-width portion 84 and the outer circumferential surface of the rotor core 8. A dimension in the radial direction of the first outer bridge 71 is set constant over the circumferential direction. A dimension in the radial direction of the second outer bridge 72 is also set constant over the circumferential direction. The first outer bridge 71 corresponds to the third angular width $\theta 3$, and the second outer bridge 72 corresponds to the fourth angular width $\theta 4$. A dimension in the circumferential direction of the first outer bridge 71 is set to be equal to the dimension in the circumferential direction of the second outer bridge 72.

The second embodiment has the following advantages.

(21) The rotor core 8 has the large-width portion 84 in an outer end in the radial direction of the first accommodation hole 8a. The large-width portion 84 corresponds to a space having a larger width than a width of the first magnet 9. The large-width portion 84 increases a magnetic resistance in the outer end in the radial direction of the first accommodation hole 8a. In other words, a magnetic path becomes far from the first magnet 9. Accordingly, it is possible to further reduce the leakage flux.

In other words, the portion around the end in the radial direction of the first accommodation hole 8a serves as a magnetic path having a low magnetic resistance, regardless of the number of the first outer bridges 71. The large-width portion 84 increases the magnetic resistance of the portion around the end in the radial direction of the first accommodation hole 8a, and reduces the leakage flux.

(22) The large-width portion 84 extends over the whole of the rotor core 8 in the axial direction. Accordingly, the magnetic resistance in the outer end in the radial direction of the first magnet 9 is increased over the whole of the rotor core 8 in the axial direction, and it is possible to further reduce the leakage flux.

(23) The inner bridge 73 exists between the inner end in the radial direction of each of the second accommodation hole 82 and the third accommodation hole 83, and the first accommodation hole 8a. The width of the inner bridge 73 is constant over the radial direction. Accordingly, it is possible to uniformly narrow the width of the inner bridge 73. Therefore, it is possible to further reduce the leakage flux indicated by the second magnetic flux line B, that is, the leakage flux immediately oriented to the S pole of the first magnet 9 itself from the N pole of the first magnet 9.

(24) The first accommodation hole 8a is positioned in the inner side in the radial direction with respect to the large-width portion 84 and the first protrusion portion 85. Accordingly, the large-width portion 84 can be provided while maintaining the constant width of the first accommodation hole 8a over the radial direction. Therefore, it is possible to maintain a simplicity of the shape of the fist magnet 9.

(25) The first angular width $\theta 1$ indicates an angular width between the large-width portion 84, and the top portion 8g of the V-shaped accommodation hole 8b. The first angular width $\theta 1$ is set to be larger than the second angular width $\theta 2$ of the inner end in the radial direction of the teeth 4. Accordingly, in comparison with the case that the first angular width $\theta 1$ is set to be smaller than the second angular width $\theta 2$, the angular width of the magnetic flux which the teeth 4 is applied from the rotor 2 becomes larger, and it is possible to achieve a high efficiency of the motor.

(26) The third angular width $\theta 3$ indicates the angular width of the large-width portion 84. The third angular width $\theta 3$ is set to be smaller than the second angular width $\theta 2$ of the inner end in the radial direction of the teeth 4. The portion between a pair of large-width portions 84 adjacent to each other substantially serves as the magnetic pole of the rotor 2, in the outer periphery of the rotor 2. In other words, the inner end in the radial direction of the teeth 4 always faces the magnetic pole of the rotor 2. Accordingly, it is possible to achieve the high efficiency of the motor.

(27) A pair of first protrusion portions 85 protrude by the same amount from both sides in the circumferential direction, in each of the first accommodation holes 8a. Accordingly, the first protrusion portion 85 can support the first magnet 9 with a good balance.

(28) As shown in FIG. 3A, the width X indicates an interval between a pair of first protrusion portions 85 in a direction orthogonal to the radial direction. The width X is set to be larger than the dimension Y in the radial direction of the large-width portion 84. Accordingly, it is easy to prevent the leakage flux passing through the space between a pair of first protrusion portions 85. In this case, the width X may be set to be identical to the dimension Y in the radial direction of the large-width portion 84. In this case, it is easy to design.

(29) The third angular width $\theta 3$ of the large-width portion 84 is set to be identical to the outer end in the radial direction of the V-shaped accommodation hole 8b, that is, the fourth angular width $\theta 4$ of the top portion 8g. Accordingly, the dimension in the circumferential direction of the first outer bridge 71 is identical to the dimension in the circumferential direction of the second outer bridge 72. Accordingly, a balance of a rigidity of the rotor core 8 is good.

(30) The dimension in the radial direction of the first outer bridge 71 is constant over the circumferential direction. The dimension in the radial direction of the second outer bridge 72 is also constant over the circumferential direction. Further, the direction in the radial direction of the first outer bridge 71 is identical to the dimension in the radial direction of the second outer bridge 72. Accordingly, it is possible to make the magnetic resistances and the rigidity of the first outer bridge 71 and the second outer bridge 72 uniform. Further, it is possible to suppress a material cost of the rotor core 8 to the minimum.

As shown in FIG. 3, in the embodiment mentioned above, the width of the inner bridge 73 as seen from the axial direction is made slightly larger than the dimensions in the radial direction of the first outer bridge 71 and the second outer bridge 72.

However, the width of the inner bridge 73 may be set to be identical to the dimension in the radial direction of the first outer bridge 71 and the second outer bridge 72. In this case, it is possible to make the magnetic resistances and the rigidity of the inner bridge 73, the first outer bridge 71 and the second outer bridge 72 identical. Accordingly, for example, it is easy to standardize the rigidity of the inner bridge 73, the first outer bridge 71 and the second outer bridge 72 to the necessary minimum value. In this case, it is possible to standardize the magnetic resistances of the inner bridge 73, the first outer bridge 71 and the second outer bridge 72 to the numerical value as large as possible.

A description will be given below of a third embodiment of the present invention with reference to FIGS. 5 to 8.

Figure 5:
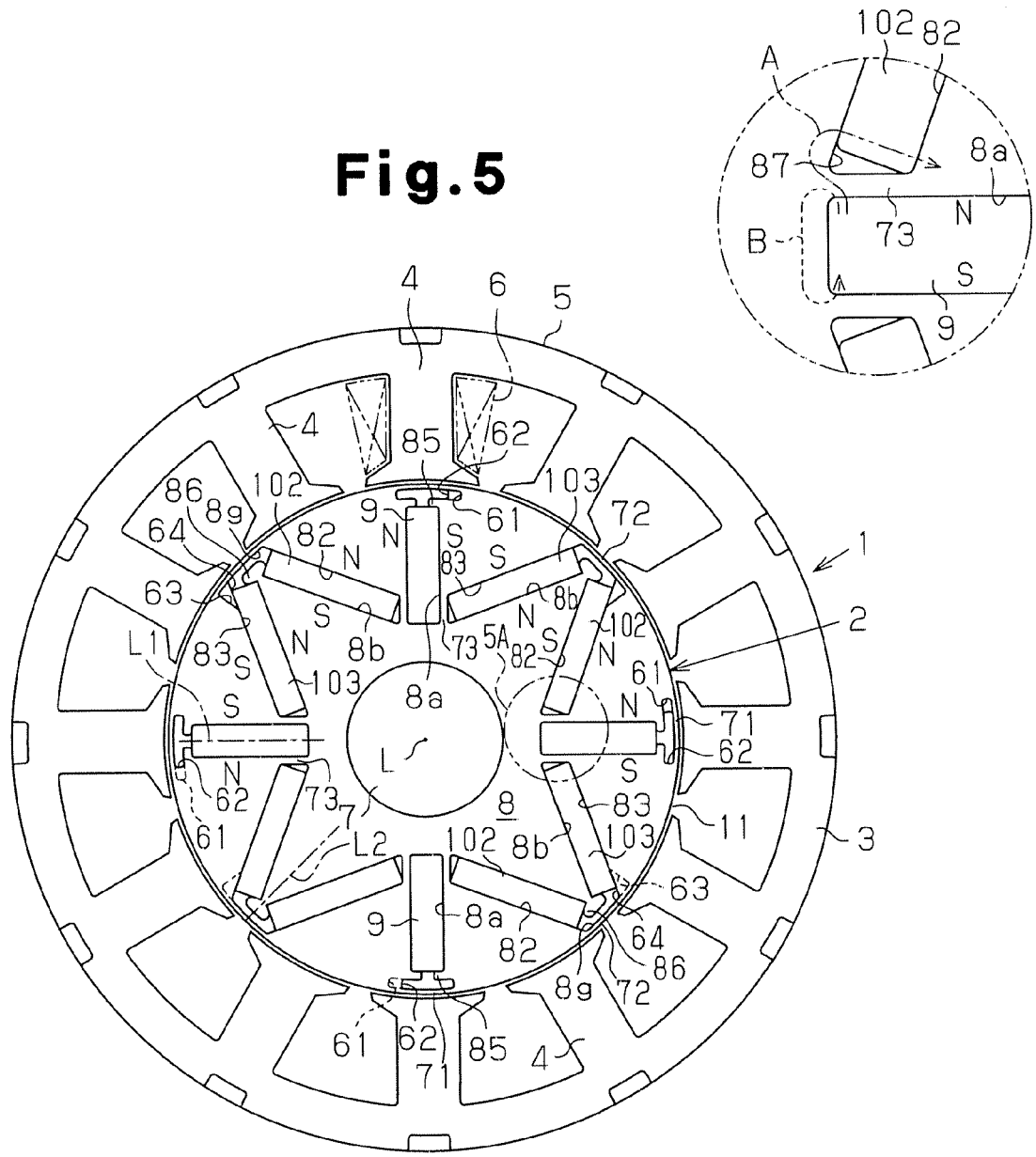
FIG. 5 is a plan view of an embedded magnet type motor in accordance with a third embodiment of the present invention.

As shown in FIG. 5, a first non-uniform portion 61 is formed in an outer end in a radial direction of each first accommodation hole 8a. The first non-uniform portion 61 has a first end, and a second end in an opposite side to the first end, with respect to a circumferential direction. The first accommodation hole 8a has a first center line L1 corresponding to the center in the circumferential direction. A distance between the first center line L1 of the first accommodation hole 8a and the first end is larger than a distance between the first center line L1 and the second end.

In detail, a width of all the outer ends in the radial direction of the first accommodation holes 8a is set to be larger than a width of the first magnet 9 arranged in the first accommodation hole 8a. The first protrusion portion 85 is positioned between the first accommodation hole 8a, and the first non-uniform portion 61. The width of the first accommodation hole 8a is constant over a radial direction.

The outer end in the radial direction of the first accommodation hole 8a has a first non-uniform portion 61 and a first uniform portion 62 alternately arranged over an axial direction. The first uniform portion 62 has a first end, and a second end in an opposite side to the first end, with respect to a circumferential direction. A distance between the first center line L1 of the first accommodation hole 8a and the first end of the first uniform portion 62 is equal to a distance between the first center line L1 and the second end.

The first non-uniform portion 61 and the first uniform portion 62 serve as the large-width portion 84 in the second embodiment in FIG. 3. The first end of the first non-uniform portion 61 is positioned away from the first end of the first uniform portion 62 with respect to the first center line L1. The second end of the first non-uniform portion 61 exists at the same distance as the second end of the first uniform portion 62, with respect to the first center line L1.

Figure 6:
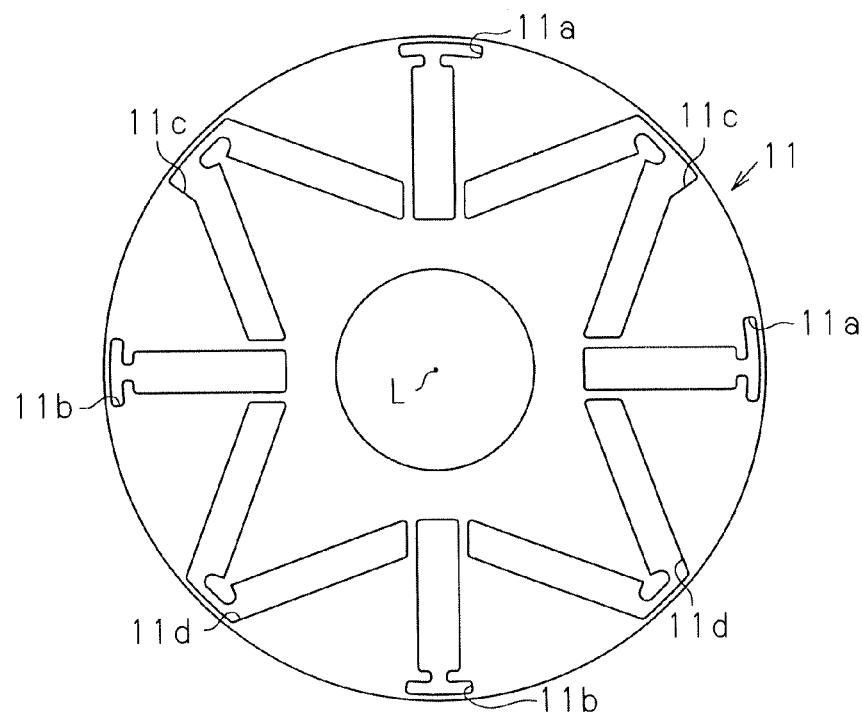
FIG. 6 is a plan view of a core sheet shown in FIG. 5.

The rotor core 8 is structured such that a core sheet 11 shown in FIG. 6 is laminated. As shown in FIG. 5, the rotor core 8 in accordance with the present embodiment has four first accommodation holes 8a distributed in the circumferential direction. The rotor core 8 has two first non-uniform portions 61 in a certain cross section vertical to the axial direction. These two first non-uniform portions 61 are continuously arranged in the circumferential direction.

The core sheet 11 shown in FIG. 5 has the first non-uniform portion 61 corresponding to the first accommodation hole 8a in an upper side of the drawing, the first non-uniform portion 61 corresponding to the first accommodation hole 8a in a right side of the drawing, the first uniform portion 62 corresponding to the first accommodation hole 8a in a lower side of the drawing, and the first uniform portion 62 corresponding to the first accommodation hole 8a in a left side of the drawing. The first ends of two first non-uniform portions 61 face each other in the circumferential direction. Two first uniform portions 62 are continuously arranged in the circumferential direction.

A second non-uniform portion 63 is formed in an outer end in the radial direction of the V-shaped accommodation hole 8b. The second non-uniform portion 63 has a first end, and a second end in an opposite side thereto, with respect to the circumferential direction. The V-shaped accommodation hole 8b has a second center line L2 serving as the center in the circumferential direction. The distance between the second center line L2 and the first end of the second non-uniform portion 63 is larger than the distance between the second center line L2 and the second end of the second non-uniform portion 63.

The top portion 8g of the V-shaped accommodation hole 8b has the second non-uniform portion 63 and a second uniform portion 64 alternately arranged over the axial direction. The distance between the second center line L2 of the V-shaped accommodation hole 8b, and the first end of the second uniform portion 64 with respect to the circumferential direction is equal to the distance between the second center line L2 and a second end of the second uniform portion 64.

As shown in FIG. 5, the rotor core 8 has four V-shaped accommodation holes 8b distributed in the circumferential direction. The rotor core 8 has two second non-uniform portions 63 arranged continuously in the circumferential direction, in a certain position in the axial direction, and two second uniform portions 64 arranged continuously in the circumferential direction. The core sheet 11 shown in FIG. 5 has the second non-uniform portion 63 corresponding to the V-shaped accommodation hole 8b in an upper right side of the drawing, the second non-uniform portion 63 corresponding to the V-shaped accommodation hole 8b in an upper left side of the drawing, the second uniform portion 64 corresponding to the V-shaped accommodation hole 8b in a lower right side of the drawing, and the second uniform portion 64 corresponding to the V-shaped accommodation hole 8b in a lower left side of the drawing. First ends of these two second non-uniform portions 63 face an opposite side to each other in the circumferential direction.

As shown in FIG. 5, the first non-uniform portion 61 and the first uniform portion 62 overlap in the radial direction. The second non-uniform portion 63 and the second uniform portion 64 overlap in the radial direction. A first outer bridge 71 is positioned between the first non-uniform portion 61 and the first uniform portion 62, and the outer circumferential surface of the rotor core 8. A second outer bridge 72 is positioned between the top portion 8g of the V-shaped accommodation hole 8b, and the outer circumferential surface of the rotor core 8.

As shown in FIG. 6, the core sheet 11 has two first pre-non-uniform portions 11a corresponding to the first non-uniform portions 61, and two first pre-uniform portions 11b corresponding to the first uniform portions 62. The core sheet 11 has two second pre-non-uniform portions 11c corresponding to the second non-uniform portions 63, and two second pre-uniform portions 11d corresponding to the second uniform portions 64.

Figure 7:
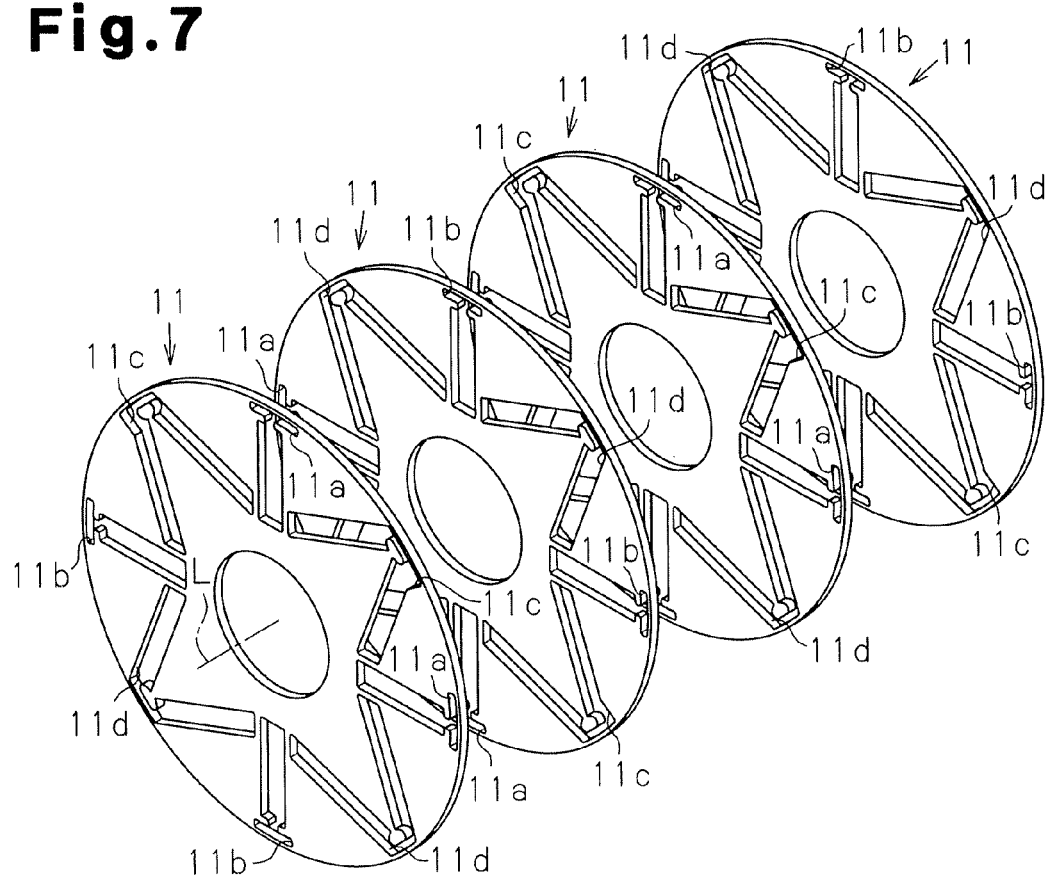
FIG. 7 is an exploded perspective view of a rotor core including a plurality of core sheets in FIG. 6.

As shown in FIG. 7, a plurality of core sheets 11 are laminated in such a manner that the first pre-non-uniform portions 11a, the first pre-uniform portions 11b, the second pre-non-uniform portions 11c, and the second pre-uniform portions lid are uniformly arranged over the axial direction of the rotor core 8, respectively. In the present embodiment, the core sheets 11 are laminated in a state in which a phase is shifted by 180 degrees around an axis L. For example, the core sheets 11 are laminated while rotated by 180 degrees in the manufacturing step of the rotor core 8.

The third embodiment has the following advantages.

(31) The first non-uniform portion 61 is formed in the outer end in the radial direction of the first accommodation hole 8a. The second non-uniform portion 63 is formed in the outer end in the radial direction of the V-shaped accommodation hole 8b. The first non-uniform portion 61 and the second non-uniform portion 63 suppress a rapid flow of the magnetic flux to the stator 1 from the rotor 2, that is, a rapid magnetic flux change. Accordingly, it is possible to reduce a cogging torque and a torque ripple of the motor.

Figure 8:
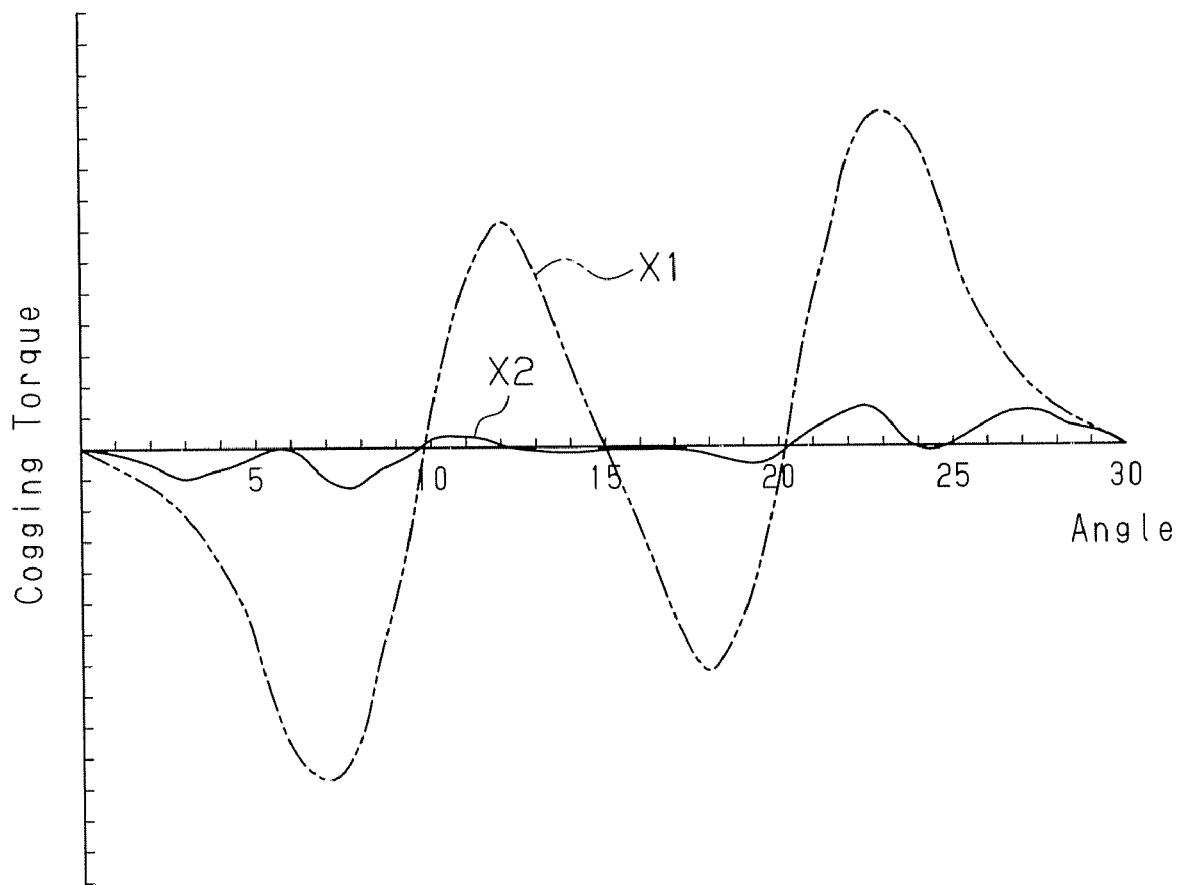
FIG. 8 is a characteristic diagram showing a relationship between an angle of rotation of a rotor in FIG. 5, and a cogging torque.

FIG. 8 is a characteristic diagram obtained through experiments and showing a relationship between an angle of rotation of the rotor 2 and a cogging torque. A first curve X1 in FIG. 8 shows a characteristic in the case that the first non-uniform portion 61 and the second non-uniform portion 63 are deleted, and a second curve X2 shows a characteristic corresponding to the present embodiment. The second curve X2 shows that the cogging torque is suppressed in comparison with the first curve X1.

In the embedded magnet type motor, a rapid flow of magnetic flux, that is, a rapid magnetic flux change is generated between the stator 1 and the rotor 2, in accordance with an increase of the torque, so that there is a risk that the cogging torque and the torque ripple are increased. The first non-uniform portion 61 and the second non-uniform portion 63 serve for reducing the cogging torque and the torque ripple.

(32) The width, that is, the dimension in the circumferential direction of the first non-uniform portion 61 is set larger than the width of the first magnet 9. The width in the circumferential direction of the first uniform portion 62 is also set larger than the width of the first magnet 9. Accordingly, the magnetic resistance in the magnetic path from the rotor 2 to the stator 1 is increased, and the magnetic path becomes far. Therefore, it is possible to further reduce the leakage flux.

(34) The rotor core 8 is formed by a plurality of core sheets 11 laminated while changing the orientation. Accordingly, one kind of core sheet 11 forms the rotor core 8 easily and in a well-balanced manner in the circumferential direction.

(35) A plurality of core sheets 11 are laminated in a state of being rotated around the axis L one by one so as to be shifted in phase. Accordingly, the first pre-non-uniform portions 11a and the second pre-non-uniform portions 11c are prevented from being densely provided in the circumferential direction. In other words, a lot of first pre-non-uniform portions 11a and second pre-non-uniform portions 11c are prevented from being densely provided in the axial direction so as to be arranged. Therefore, it is possible to further lower the cogging torque and the torque ripple.

For example, if a lot of first pre-non-uniform portions 11a and second pre-non-uniform portions 11c corresponding to spaces are densely arranged in the axial direction, a space elongated in the axial direction exists in the rotor core 8. The space mentioned above causes the rotor core 8 to be partly flexed easily. In the present embodiment, since the first pre-non-uniform portion 11a and the second pre-non-uniform portion 11c are uniformly arranged, it is possible to prevent the rotor core 8 from being deformed.

A description will be given below of a fourth embodiment of the present invention with reference to FIGS. 9 and 10.

In the fourth embodiment, the first non-uniform portion 61 is uniformly formed over the axial direction of the rotor core 8, as is different from the third embodiment in FIG. 5.

In the rotor core 8 in FIG. 5, the first non-uniform portions 61 and the first uniform portions 62 alternately exist in the axial direction. However, in the case shown in FIG. 9, the first non-uniform portion 61 is continuously laminated over the whole in the axial direction of the rotor core 8. The first uniform portion 62, the second non-uniform portion 63 and the second uniform portion 64 are uniformly formed in the axial direction of the rotor core 8.

Figure 10:
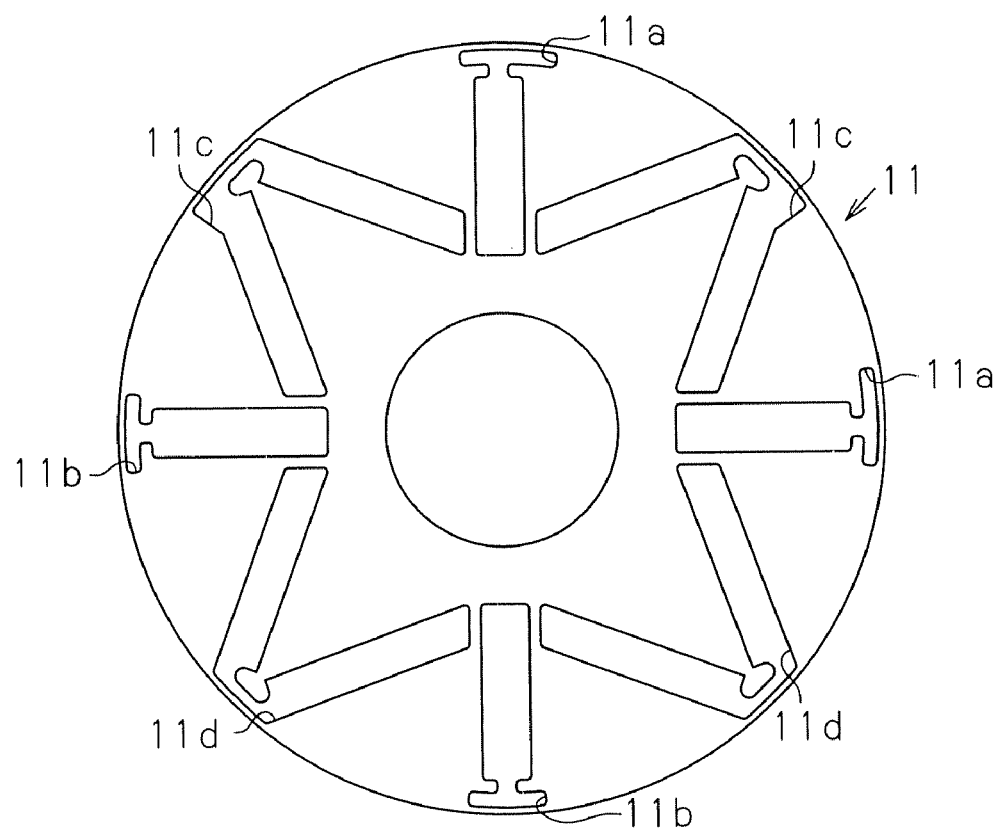
FIG. 10 is a plan view of a core sheet in the motor in FIG. 9.

FIG. 10 shows a similar core sheet 11 to FIG. 6. A plurality of core sheets 11 are laminated in the same phase in such a manner that the first pre-non-uniform portions 11a are uniformly arranged in the axial direction, whereby the rotor core 8 is structured. The second pre-non-uniform portion 11c, the first pre-uniform portion 11b and the second pre-uniform portion 11d are respectively arranged uniformly in the axial direction.

The fourth embodiment has the following advantages.

(41) The first non-uniform portion 61 is provided in an outer end in a radial direction of two of the four first accommodation holes 8a. The first non-uniform portion 61 extends uniformly over the axial direction of the rotor core 8. The second non-uniform portion 63 is formed in the outer end in the radial direction of two of the four V-shaped accommodation holes 8b, over the axial direction of the rotor core 8. Accordingly, the structure which suppresses the complication of the shape of the rotor core 8 is achieved. It is possible to suppress the periodically generated rapid flow of the magnetic flux from the rotor 2 to the stator 1, by the simple structure of the rotor core 8. As a result, the cogging torque and the torque ripple can be reduced.

In other words, it is possible to easily form the rotor core 8 only by simply laminating one kind of core sheet 11. For example, it is possible to omit a labor hour for rotating the core sheet 11 around the axis L, and it is possible to omit a labor hour for inverting of the core sheet 11.

The embodiment mentioned above may be modified as follows.

Figure 11:
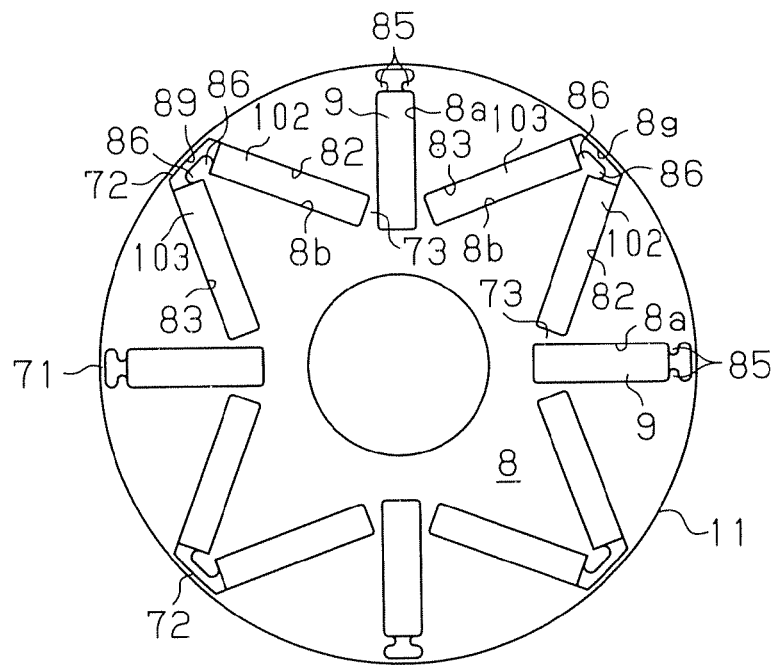
FIG. 11 is a plan view of a modification of the motor shown in FIG. 1.

As shown in FIG. 11, a pair of first protrusion portions 85 may be formed in an outer end in the radial direction of each first accommodation hole 8a by deforming the rotor core 8 in FIG. 1. A pair of second protrusion portions 86 may be formed in an outer end in each radial direction of the V-shaped accommodation hole 8b. In FIG. 11, a width, that is, a dimension in the circumferential direction of a space in an outer side in the radial direction of the first protrusion portion 85 is equal to the width of the first protrusion portion 85.

Figure 12:
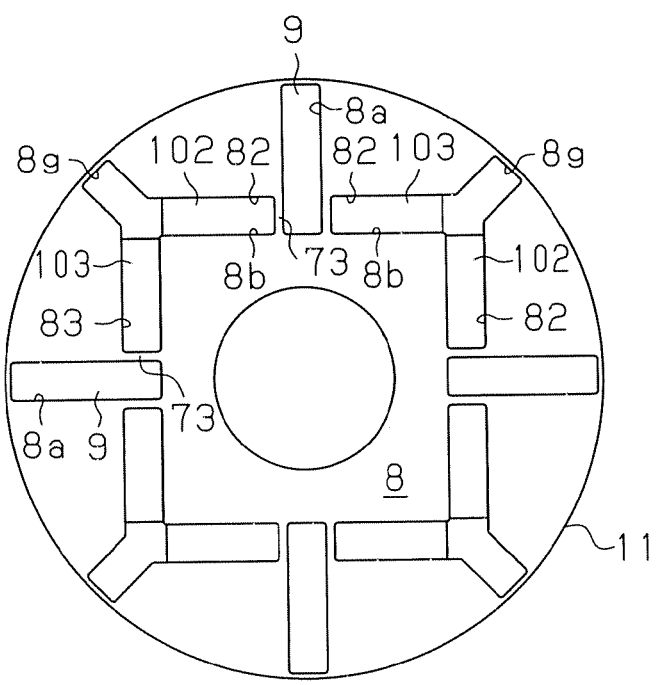
FIG. 12 is a plan view of a rotor of another modification.

As shown in FIG. 12, the second accommodation hole 82 and the third accommodation hole 83 may be arranged in such a manner as to extend in a vertical direction to the longitudinal direction of the first accommodation hole 8a. A top portion 8g of the V-shaped accommodation hole 8b may extend outward in the radial direction from a connection portion between an outer end in the radial direction of the second accommodation hole 82 and an outer end in the radial direction of the third accommodation hole 83 so as to reach a portion near an outer circumferential surface of the rotor core 8.

In this case, a width of an inner bridge 73 defined between the first accommodation hole 8a and an inner end in the radial direction of the second accommodation hole 82 is constant over the radial direction. A width of an inner bridge defined between the first accommodation hole 8a and an inner end in the radial direction of the third accommodation hole 83 is also constant over the radial direction. Accordingly, the inner bridge 73 further reduces the leakage flux.

For example, in the case that at least one of the second accommodation hole 82 and the third accommodation hole 83 is inclined with respect to the first accommodation hole 8a, the width of the inner bridge can become a different value over the radial direction. Accordingly, the wide portion of the inner bridge serves as the magnetic path, and there is a risk that the leakage flux is increased. The rotor core 8 in FIG. 12 suppresses an increase of the width of the inner bridge 73 and reduces the leakage flux.

In the case of FIG. 12, the number of the magnetic poles is eight. Four first accommodation holes 8a extend in a vertical direction or a horizontal direction in the drawing. Four second accommodation holes 82 also extend in the vertical direction or the horizontal direction. Four third accommodation holes 83 also extend in the vertical direction or the horizontal direction. In other words, all the first magnet 9 to the third magnet 103 extend in two directions perpendicular to each other. Accordingly, it is easy to assemble the first magnet 9 to the third magnet 103 to the rotor core 8.

Figure 13:
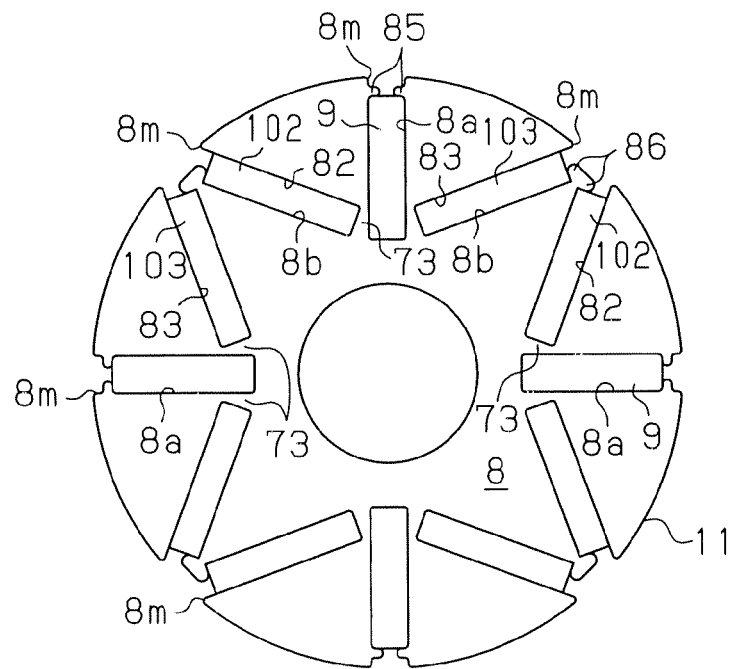
FIG. 13 is a plan view of a rotor of another modification.

As shown in FIG. 13, it is possible to delete all the first outer bridges 71 and all the second outer bridges 72 in FIG. 11. In other words, it is possible to leave the outer ends in the radial direction of the first accommodation hole 8a to the third accommodation hole 83 open to the outer periphery of the rotor core 8. An opening in the outer periphery of the rotor core 8 is referred to as an outer circumferential segmentation portion 8m. Since the first outer bridge 71 and the second outer bridge 72 are deleted, the leakage flux can be suppressed.

In other words, it is possible to make the dimension in the axial direction of at least one of the first outer bridge 71, the second outer bridge 72, and the inner bridge 73 smaller than the dimension in the axial direction of the whole of the rotor core 8. With respect to the axial direction, the intermediate portion of the rotor core 8 may have a space for deleting at least a part of the first outer bridge 71, the second outer bridge 72, and the inner bridge 73. In other words, the density of the rotor core 8 with respect to the axial direction may be made smaller than the density in the other portions of the rotor core 8, in the portion corresponding to at least one of the first outer bridge 71, the second outer bridge 72 and the inner bridge 73. In order to make the density of a part of the rotor core 8 small, the density may be set to zero.

Figure 14:
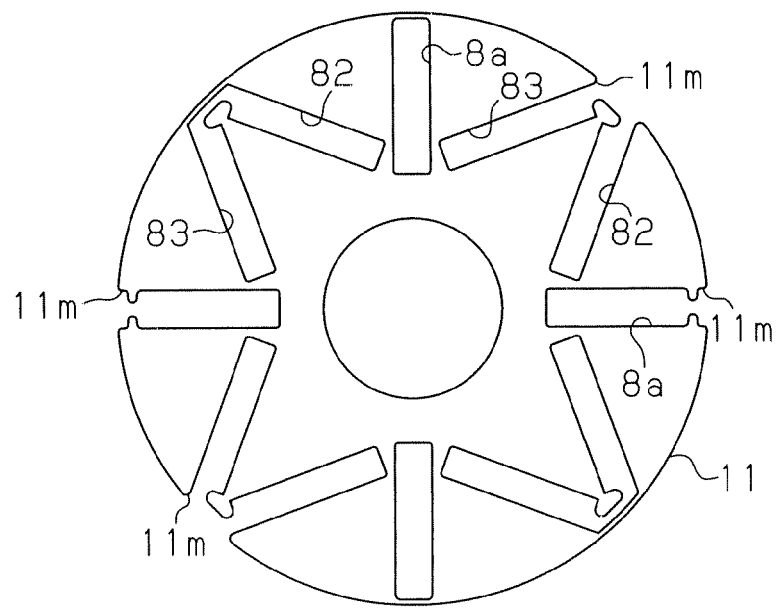
FIG. 14 is a plan view of a core sheet in another modification.

As shown in FIG. 14, it is possible to delete two first outer bridges 71 separated by 180 degrees from each other, in four first outer bridges 71 of the core sheet 11 in FIG. 11. Further, two second outer bridges 72 separated by 180 degrees from each other are deleted in four second outer bridges 72. In other words, totally four pre-outer circumferential segmentation portions 11m may be formed in one core sheet 11.

Figure 15A:
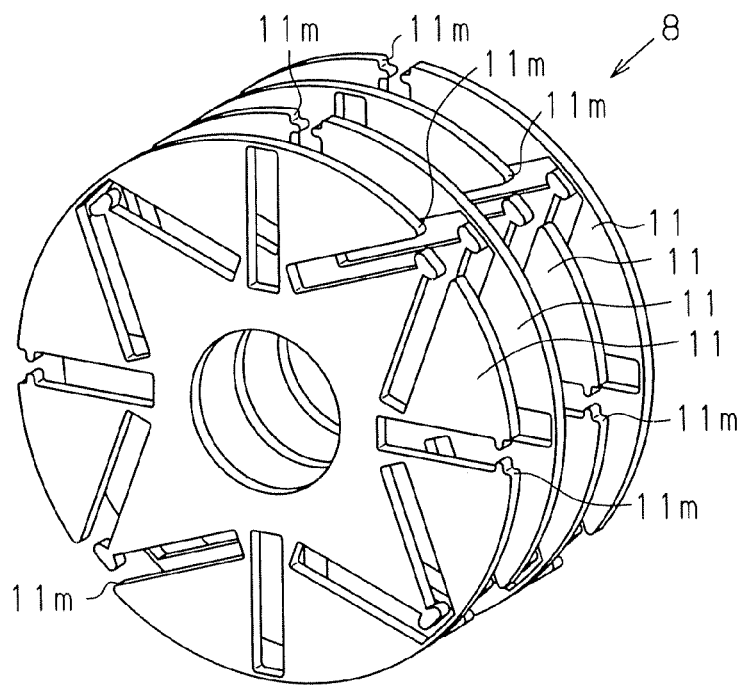
FIG. 15A is an exploded perspective view of a rotor core including a plurality of core sheets in FIG. 14.
Figure 15B:
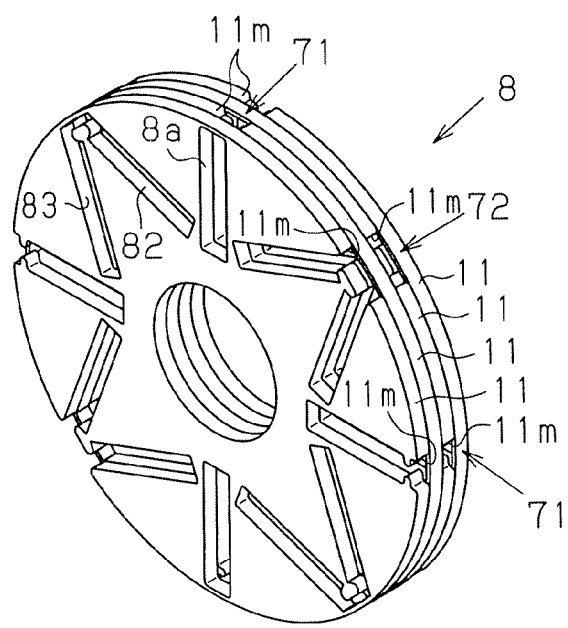
FIG. 15B is a perspective view of a rotor core in which the core sheets in FIG. 15A are laminated.

As shown in FIGS. 15A and 15B, each of the core sheets 11 may be laminated while being rotated around the center axis by 90 degrees in such a manner that the pre-outer circumferential segmentation portions 11m are uniformly distributed in the rotor core 8. The rotor core 8 in FIGS. 14, 15A and 15B are structured such that the core sheets 11 are laminated one by one while being rotated.

In this case, the density with respect to the axial direction of the portion of the rotor core 8 corresponding to the first outer bridge 71 and the second outer bridge 72 is smaller than the density in the other portions of the rotor core 8. Accordingly, it is possible to further reduce the leakage flux.

It is possible to easily form the well-balanced rotor core 8 with respect to the circumferential direction by laminating one kind of core sheet 11 shown in FIG. 14. Since the core sheets 11 are laminated while being rotated one by one, it is possible to prevent a lot of pre-outer circumferential segmentation portions 11m from being densely arranged in the axial direction. Accordingly, the deformation of the rotor core 8 can be prevented. For example, if a lot of pre-outer circumferential segmentation portions 11m are arranged in the axial direction, a gap elongated in the axial direction is formed, and there is a risk that the rotor core tends to be partly flexed. The rotor core 8 in FIG. 15 is prevented from being flexed.

The core sheet may have the pre-outer circumferential segmentation portion 11m or the pre-inner circumferential segmentation portion in such a manner as to correspond only to all the first accommodation holes 8a and a part of the V-shaped accommodation holes 8b. It is preferable to laminate the core sheets 11 while rotating around the axis in such a manner that the rotor core 8 uniformly has the pre-outer circumferential segmentation portions 11m and the pre-inner circumferential segmentation portions in the circumferential direction. In other words, a plurality of core sheets 11 are laminated in a state in which the phases are shifted.

The rotor core 8 may be structured by laminating the core sheets 11 per group unit of a plurality of core sheets 11 while rotating. In this case, since the number of rotation of the core sheets 11 is reduced until the manufacturing of the rotor core 8 is finished, it is easy to manufacture the rotor core 8.

The rotor core 8 uniformly having the pre-outer circumferential segmentation portions 11m and the pre-inner circumferential segmentation portions in the circumferential direction may be structured by laminating the core sheets 11 while inverting if. The core sheets 11 may be laminated by inverting them one by one, or the core sheets 11 per group unit of a plurality of core sheets 11 may be laminated by inverting them.

It is not necessary to invert the core sheets 11 in the middle of the laminating step. For example, the lamination is preferably executed by preparing a group of core sheets 11 previously directed face-up, and a group of core sheet 11 previously directed face-down, and alternately picking up the core sheets 11 one by one or plural sheets by plural sheets from the respective groups of the core sheets 11. In this case, since it is possible to omit a fine control of a rotation angle, it is easy to manufacture.

It is possible to laminate plural kinds of core sheets 11 having at least one of the pre-outer circumferential segmentation portion 11m and the pre-inner circumferential segmentation portion so as to be densely arranged in the circumferential direction. In this case, it is possible to structure the rotor core 8 in which the pre-outer circumferential segmentation portion 11m and the pre-inner circumferential segmentation portion are uniformly arranged in the circumferential direction. In this case, it is possible to omit the rotation of the core sheet 11 around the axis L, and it is possible to omit the lamination of the core sheet 11 while inverting it.

Figure 16:
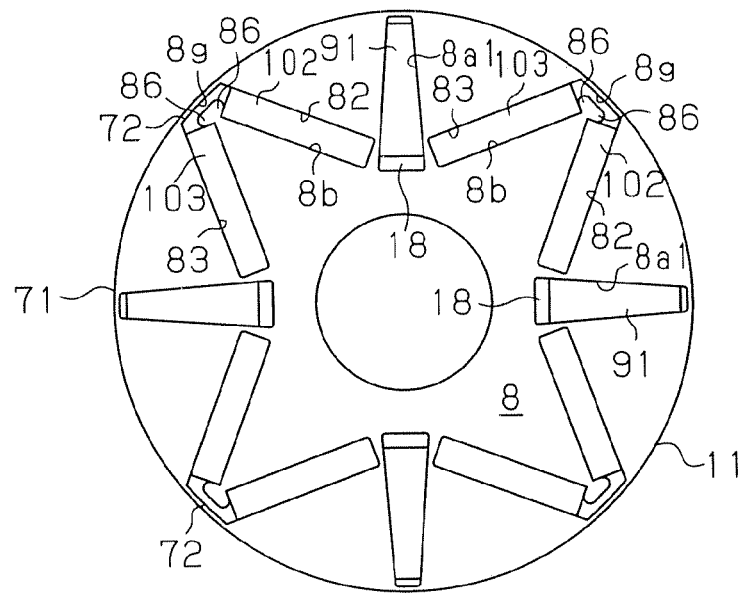
FIG. 16 is a plan view of a rotor of another modification.

As shown in FIG. 16, first accommodation holes 8a1, and first magnets 91 accommodated in the first accommodation holes 8a1 may be formed in a trapezoidal shape of which the width becomes narrower toward an outer side in a radial direction. The width of an outer end in the radial direction of the first magnet 91 is set to be slightly larger than the width of the outer end in the radial direction of the first accommodation hole 8a1.

In this case, the first magnet 91 is urged outward in the radial direction by a centrifugal force at a time when the rotor 2 is rotated, and is pressed to an inner wall surface of the first accommodation hole 8a. Accordingly, a gap between the first magnet 9 and the rotor core 8 is stably made small. Therefore, it is possible to stably achieve a high torque. The first accommodation hole 8a1 accommodates a non-magnetic part 18 for energizing the first magnet 91 outward in the radial direction. The non-magnetic part 18 is made of a resin material, and is press fitted to an inner end in the radial direction of the first accommodation hole 8a1. Accordingly, it is possible to further stably make the gap between the first magnet 91 and the rotor core 8 small. As a result, it is possible to further stably achieve the high torque.

As mentioned above, the width of the first accommodation hole 8a is not always constant over the radial direction. The first magnet 9 is not always formed in the rectangular parallelepiped shape.

Figure 17:
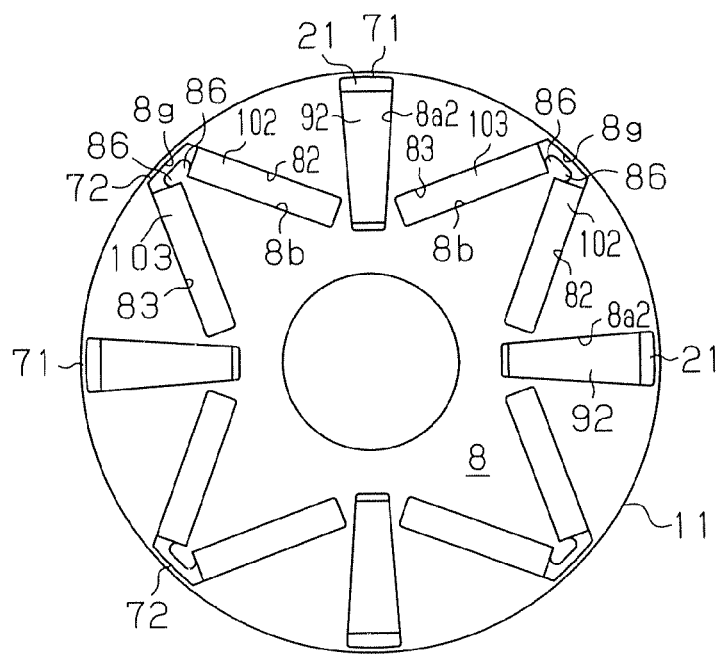
FIG. 17 is a plan view of a rotor of another modification.

As shown in FIG. 17, a first accommodation hole 8a2 may be formed in a trapezoidal shape of which the width is expanded toward an outer side in the radial direction. A first magnet 92 accommodated in the first accommodation hole 8a2 is formed in a trapezoidal shape of which the width is expanded toward the outer side in the radial direction. The width of an inner end in the radial direction of the first magnet 92 is slightly larger than a width of an inner end in the radial direction of the first accommodation hole 8a2.

In this case, it is possible to elongate a first outer bridge 71 between an outer end in the radial direction of the first accommodation hole 8a2 and the outer circumferential surface of the rotor core 8 in the circumferential direction. Accordingly, it is possible to reduce the leakage flux passing through the first outer bridge 71.

As shown in FIG. 17, the first accommodation hole 8a2 accommodates a non-magnetic part 21 for energizing the first magnet 92 to an inner side in the radial direction. The non-magnetic part 21 is made of a resin material, and is press fitted to an outer end in the radial direction of the first accommodation hole 8a2. Accordingly, it is possible to stably make a gap between the first magnet 92 and the rotor core 8 small, and it is further possible to stably achieve a high torque. In the case of fixing the first magnets 91 and 92 to the rotor core 8, the non-magnetic parts 18 and 21 may be omitted.

Figure 18:
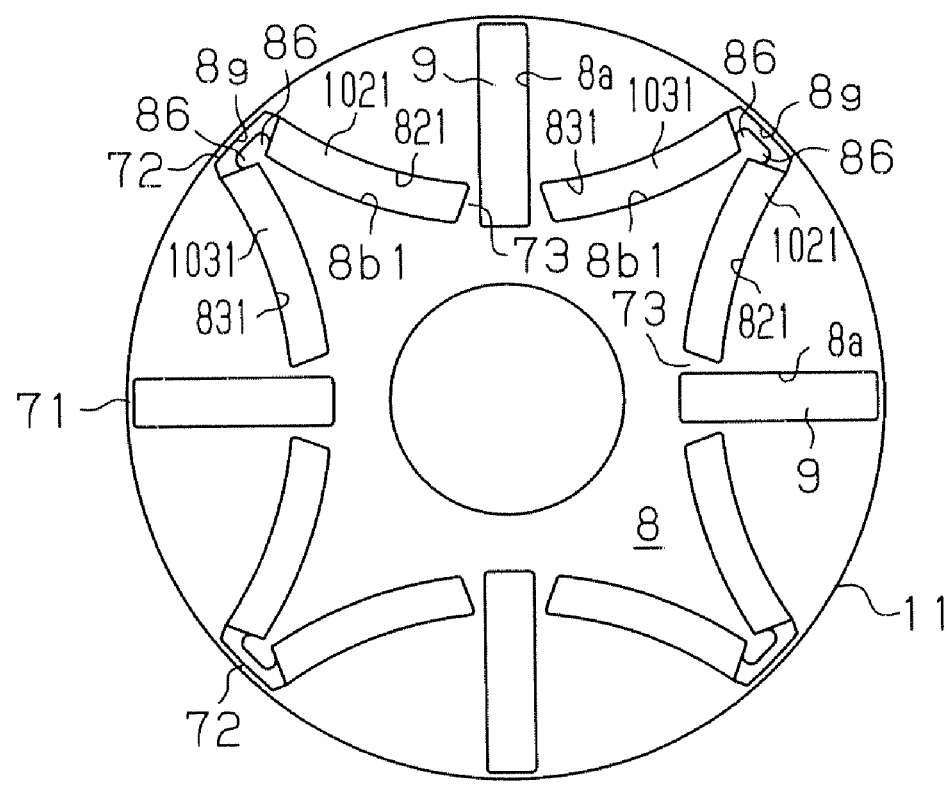
FIG. 18 is a plan view of a rotor of another modification.

As shown in FIG. 18, a second accommodation hole 821 and a third accommodation hole 831 of the V-shaped accommodation hole 8b1 may have such a curved shape that center portions approach each other. A second magnet 1021 and a third magnet 1031 are curved in the same manner as the second accommodation hole 821 and the third accommodation hole 831. In this case, it is easy to elongate the second magnet 1021 and the third magnet 1031 in comparison with the rectangular parallelepiped magnet in a limited area, and it is possible to further achieve a high torque.

In contrast, the second accommodation hole 821 and the third accommodation hole 831 of the V-shaped accommodation hole 8b1 may have such a curved shape that the center portions are away from each other.

As mentioned above, the V shape of the V-shaped accommodation hole 8b includes a shape in which the second accommodation hole 82 and the third accommodation hole 83 corresponding to two lines of the V shape are respectively curved. Further, it includes a shape in which the width of the second accommodation hole 82 and the width of the third accommodation hole 83 are not constant. The second magnet 102 and the third magnet 103 accommodated in the V-shaped accommodation hole 8b include a magnet which is curved, and a magnet in which the width is not constant.

The inner ends in the radial direction of the second accommodation hole 82 and the third accommodation hole 83 may be arranged in such a manner as not to face the first magnetic flux outflow surface 9a or the first magnetic flux inflow surface 9b of the first magnet 9.

The first magnet 9 to the third magnet 103 and the rotor core 8 may be arranged so as to be separated in the axial direction and be displaced in the circumferential direction. In this case, it is possible to further reduce the rapid change of the magnetic flux between the stator 1 and the rotor 2, and it is possible to further reduce the cogging torque.

Figure 19:
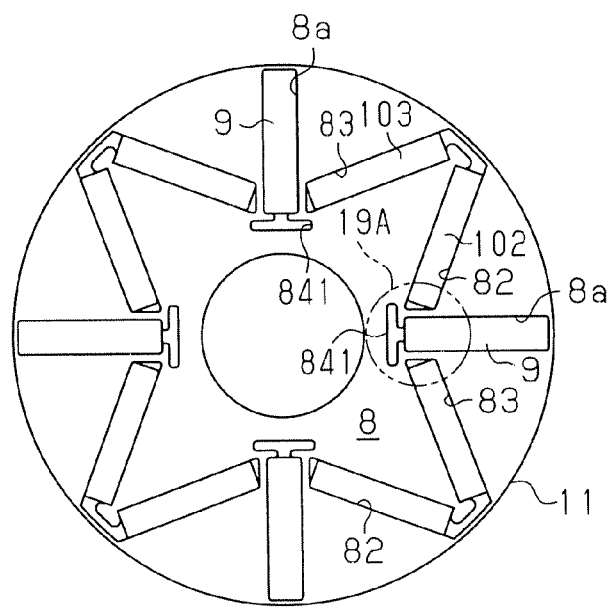
FIG. 19 is a plan view of a rotor of another modification of the motor in FIG. 3.
Figure 19A:
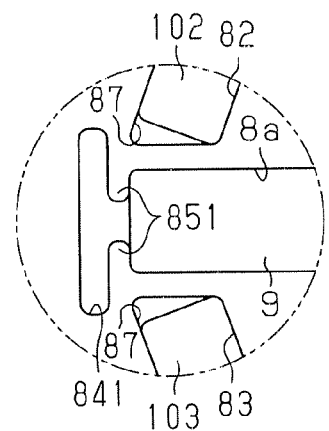
FIG. 19A is a partial enlarged view of an inner end in a radial direction of a first accommodation hole in FIG. 19.

As shown in FIG. 19, a large-width portion 841 may be formed only in the inner end in the radial direction of the first accommodation hole 8a. As shown in FIG. 19A, a first protrusion portion 851 regulates a movement of the first magnet 9 to the inner side in the radial direction.

Figure 20:
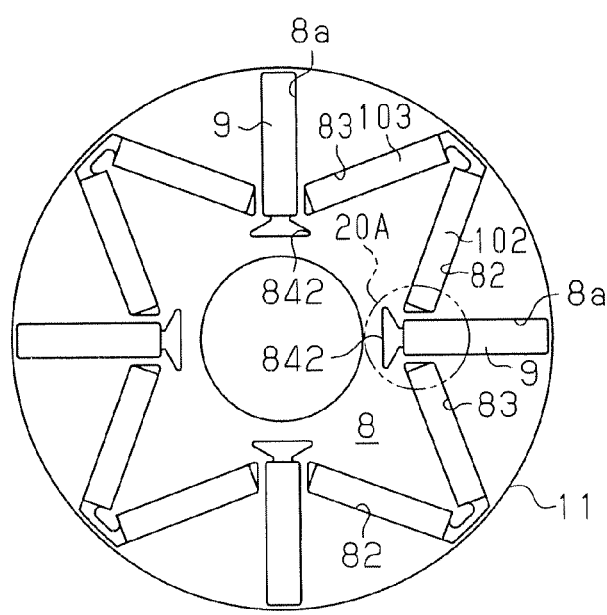
FIG. 20 is a plan view of a rotor of another modification.
Figure 20A:
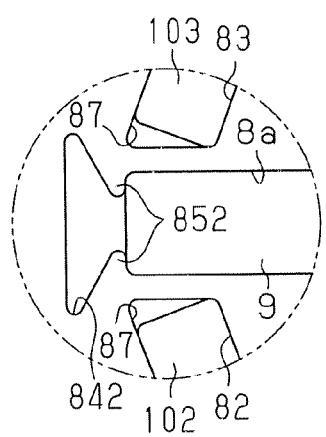
FIG. 20A is a partial enlarged view of an inner end in a radial direction of a first accommodation hole in FIG. 20.

As shown in FIG. 20, a large-width portion 842 may be formed as an isosceles triangular shaped space in the inner end in the radial direction of the first accommodation hole 8a. As shown in FIG. 20A, a width of the large-width portion 842 is increased toward the inner side in the radial direction. The first protrusion portion 852 is also formed in an isosceles triangular shape.

In the case of FIGS. 19 and 20, the magnetic resistance in the inner end in the radial direction of the first accommodation hole 8a is increased. Accordingly, it is possible to further reduce the leakage flux.

The large-width portion 84 may be formed in both of the inner end in the radial direction and the outer end in the radial direction of the first accommodation hole 8a.

Figure 21:
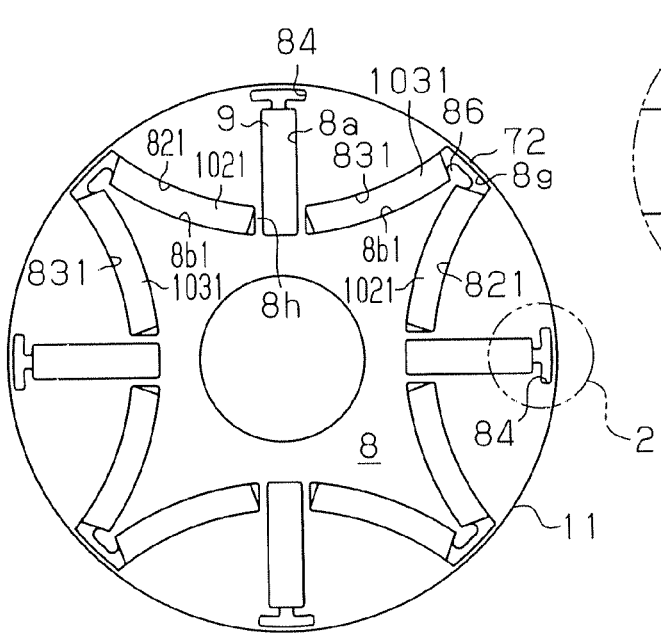
FIG. 21 is a plan view of a rotor of another modification.
Figure 21A:
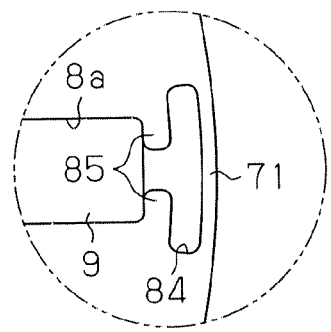
FIG. 21A is a partial enlarged view of an outer end in a radial direction of a first accommodation hole in FIG. 21.

As shown in FIG. 21, the second accommodation hole 821 and the third accommodation hole 831 of the V-shaped accommodation hole 8b1 are curved in such a manner that the center portions approach each other. The second magnet 1021 and the third magnet 1031 are curved in the same manner. As shown in FIG. 21A, the large-width portion 84 is formed in the outer end in the radial direction of the first accommodation hole 8a.

Figure 22:
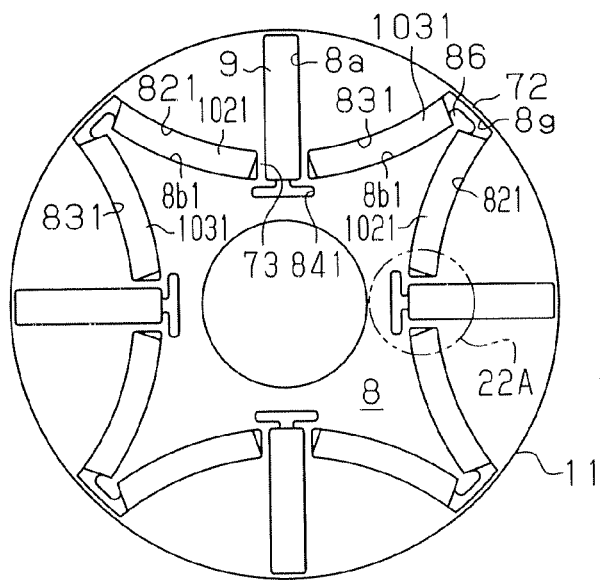
FIG. 22 is a plan view of a rotor of another modification.
Figure 22A:
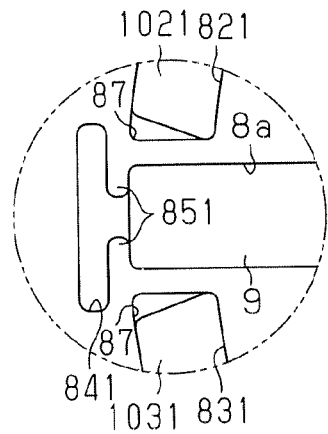
FIG. 22A is a partial enlarged view of an inner end in a radial direction of a first accommodation hole in FIG. 22.

As shown in FIG. 22, in the case that the large-width portion 841 is formed in the inner end in the radial direction of the first accommodation hole 8a, the second accommodation hole 821 and the third accommodation hole 831 of the V-shaped accommodation hole 8b1 may be curved in such a manner that the center portions approach each other. As shown in FIG. 22A, the large-width portion 841 is positioned in the inner side in the radial direction in comparison with the second accommodation hole 821 and the third accommodation hole 831.

The large-width portion 84 is not formed in the whole in the axial direction of the rotor core 8, but the large-width portion 84 may be formed only in a part in the axial direction in the rotor core 8. In this case, it is possible to obtain the advantage (21) while ensuring the rigidity of the rotor core 8.

The rotor core 8 shown in FIG. 24B may be formed by laminating a first core sheet 111 shown in FIG. 23A and a second core sheet 112 shown in FIG. 23B. FIG. 24B shows only a part of the rotor core 8.

The first core sheet 111 shown in FIG. 23A has a pre-large-width portion 111a corresponding to the large-width portion 84. The second core sheet 112 shown in FIG. 23B has a same width portion 112a at a position corresponding to the large-width portion 84. The same width portion 112a has the same width as the width of the first accommodation hole 8a. The rotor core 8 shown in FIG. 24B is formed by alternately laminating the first core sheet 111 and the second core sheet 112 one by one as shown in FIG. 24A. The rotor core 8 has the large-width portion 84 only in a part in the axial direction.

In this case, it is possible to easily manufacture the rotor core 8 having the large-width portion 84 only in a part of the outer end in the axial direction of the first accommodation hole 8a, by laminating two kinds of core sheets 111 and 112. In this case, it is possible to suppress the rapid magnetic flux flow, that is, the magnetic flux change between the stator 1 and the rotor core 8, for example, in comparison with the case having the large-width portion 84 in the whole in the axial direction. Accordingly, it is possible to reduce the cogging torque and the torque ripple.

In the case shown in FIGS. 24A and 24B, two second core sheets 112 are laminated on two first core sheets 111, however, the number of the sheets may be changed. Further, it is not necessary to alternately laminate the first core sheet 111 and the second core sheet 112 one by one, but they may be alternately laminated plural sheets by plural sheets. The kind of the core sheets 111 and 112 may be changed to three or more kinds.

In the case shown in FIG. 19, the large-width portion 841 in the inner end in the radial direction of the first accommodation hole 8a may be formed only in a part in the axial direction of the rotor core 8.

Figure 25:
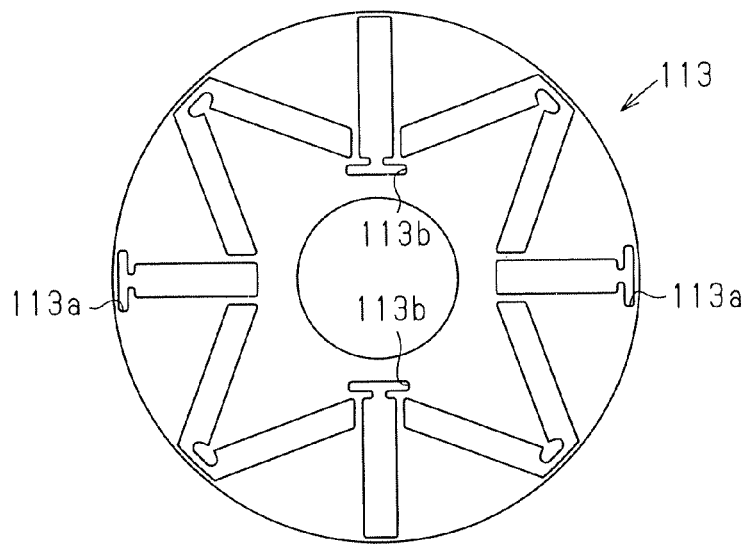
FIG. 25 is a plan view of a core sheet of another modification.

As shown in FIG. 25, the core sheet 113 may have a first pre-large-width portion 113a provided in the outer end in the radial direction of each of the right and left first accommodation holes 8a, and a second pre-large-width portion 113b provided in the inner end in the radial direction of each of the upper and lower first accommodation hole 8a. In other words, the first pre-large-width portion 113a and the second pre-large-width portion 113b are partly positioned with respect to the circumferential direction of the core sheet 113. The first pre-large-width portion 113a is positioned at an interval of 180 degrees. In other words, the first pre-large-width portion 113a is positioned at every other first accommodation holes 8a. The second pre-large-width portion 113b is also positioned at an interval of 180 degrees. The first pre-large-width portion 113a is laminated in a state in which the phase is shifted by 90 degrees with respect to the second pre-large-width portion 113b. The core sheet 113 is laminated in such a manner that the first pre-large-width portion 113a and the second pre-large-width portion 113b are uniformly positioned in the circumferential direction in the rotor core 8.

Figure 26A:
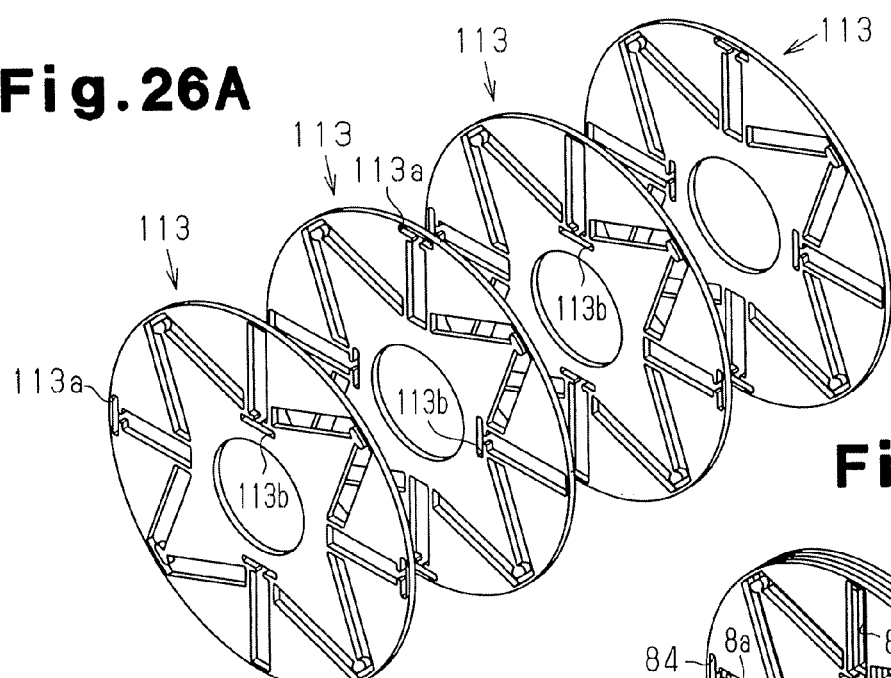
FIG. 26A is an exploded perspective view of a rotor core including a plurality of core sheets in FIG. 25.
Figure 26B:
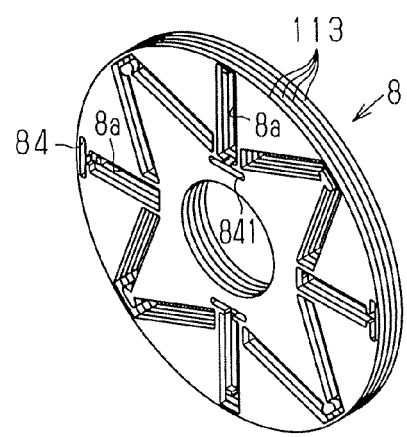
FIG. 26B is a perspective view of a rotor core in which a plurality of core sheets in FIG. 26A are laminated.

As shown in FIG. 26A, the first pre-large-width portion 113a and the second pre-large-width portion 113b are alternately laminated one by one while being rotated by 90 degrees. As a result, the rotor core 8 shown in FIG. 26B is formed. The rotor core 8 has the large-width portion 84 in the outer end in the radial direction of the first accommodation hole 8a, and the large-width portion 841 in the inner end in the radial direction.

In this case, it is possible to easily form the rotor core 8 having the large-width portions 84 and 841 in a well-balanced manner in the circumferential direction, by laminating one kind of core sheet 113. The first pre-large-width portion 113a and the second pre-large-width portion 113b laminated while being rotated by 90 degrees are prevented from being arranged continuously in a large number in the axial direction in the rotor core 8. Accordingly, the deformation of the rotor core 8 is prevented. In other words, the first pre-large-width portion 113a and the second pre-large-width portion 113b are prevented from being arranged in a large number in the axial direction, and the rotor core 8 is prevented from being partly flexed.

The number of the core sheet 113 may be changed. It is possible to laminate while rotating per a plurality of core sheets 113. The rotor core 8 uniformly having the first pre-large-width portion 113a and the second pre-large-width portion 113b in the circumferential direction may be formed by laminating the core sheet 113 while inverting if.

Figure 27:
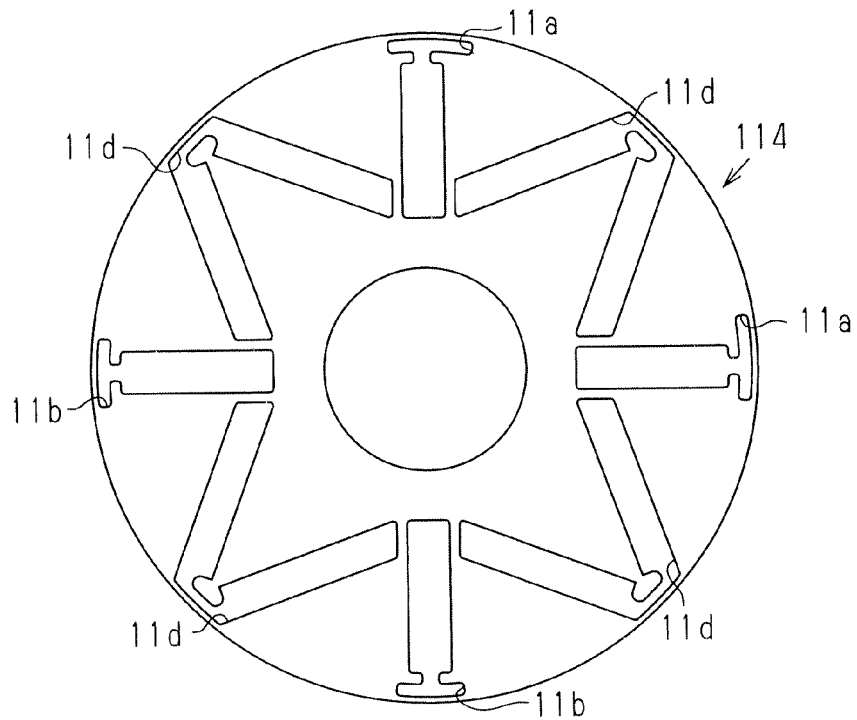
FIG. 27 is a plan view of a core sheet of another modification.
Figure 28:
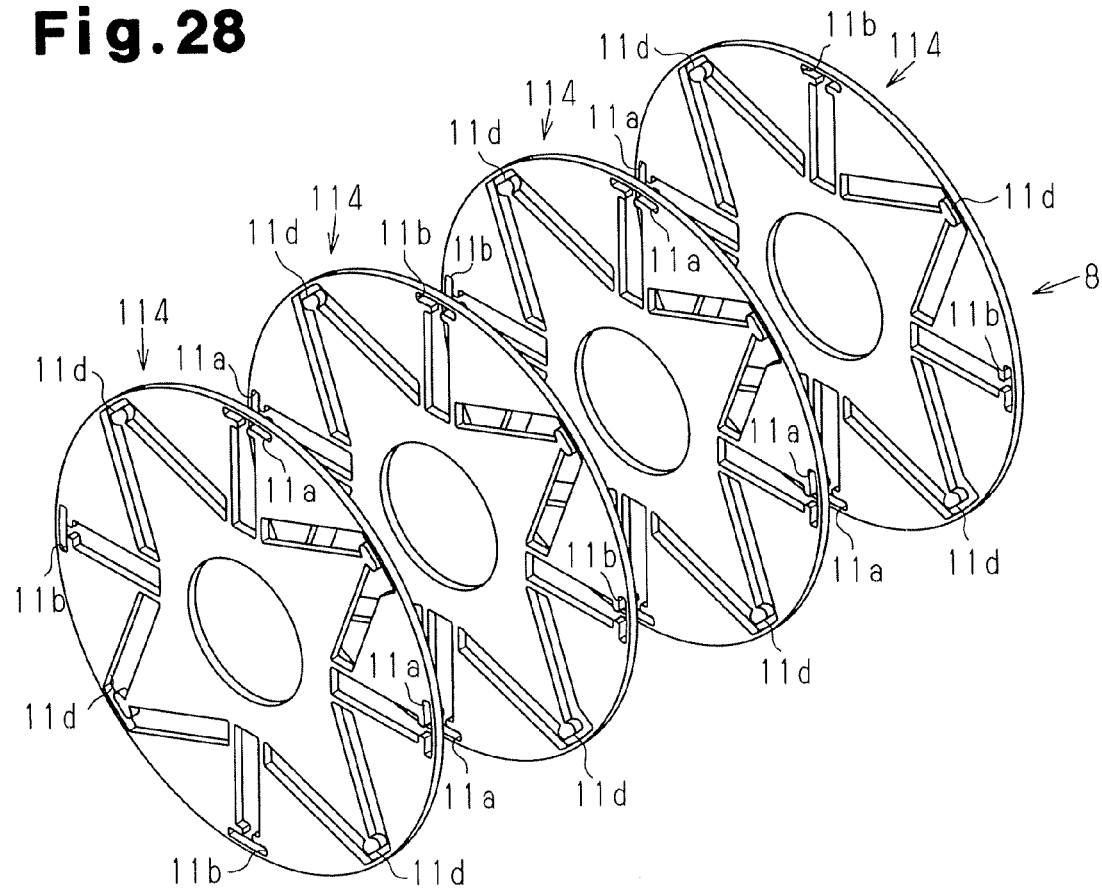
FIG. 28 is an exploded perspective view of a rotor core including a plurality of core sheets in FIG. 27.

As shown in FIG. 27, the core sheet 114 is obtained by deleting the second pre-non-uniform portions 11c corresponding to the V-shaped accommodation holes 8b from the core sheet 11 shown in FIG. 6. In other words, the core sheet 114 shown in FIG. 27 is provided with two first pre-non-uniform portions 11a, two first pre-uniform portions 11b, and four second pre-uniform portions 11d. As shown in FIG. 28, the rotor core 8 is formed by laminating the core sheets 114 while rotating each of them by 180 degrees. In this case, it is possible to easily form the rotor core having a good balance in the circumferential direction, by laminating one kind of core sheet 114.

The large-width portion 84 may be provided in the outer end in the radial direction of the first accommodation hole 8a2 shown in FIG. 17. The first accommodation hole 8a2 is formed in such a trapezoidal shape that the width in the outer side in the radial direction is large.

Protruding amounts of a pair of first protrusion portions 85 in the first accommodation hole 8a may be different from each other. One of a pair of first protrusion portions 85 may be deleted.

In FIG. 3A, the width X between a pair of first protrusion portions 85 is not limited to be larger than a dimension in the radial direction of the large-width portion 84. The width X may be set to be equal to or less than the dimension Y in the radial direction.

In FIG. 3, the third angular width θ3 of the outer end in the radial direction of the first accommodation hole 8a may be different from a fourth angular width θ4 of the outer end in the radial direction of the V-shaped accommodation hole 8b. In other words, the dimension in the circumferential direction of the first outer bridge 71 may be different from the dimension in the circumferential direction of the second outer bridge 72.

In FIG. 3, the dimension in the radial direction of the first outer bridge 71 may be different from the dimension in the radial direction of the second outer bridge 72. The dimension in the radial direction of at least one of the first outer bridge 71 and the second outer bridge 72 may be changed with respect to the circumferential direction.

The dimension in the axial direction of each of the first magnet 9 to the third magnet 103 is not limited to be set to be equal to the dimension in the axial direction of the rotor core 8. The dimension in the axial direction of the first magnet 9 to the third magnet 103 may be made shorter than the dimension in the axial direction of the rotor core 8. In this case, the movement in the axial direction of the first magnet 9 to the third magnet 103 may be regulated by accommodating the non-magnetic body in the gap in which the magnet does not exist in the first accommodation hole 8a. The dimension in the axial direction may be different among the first magnet 9 to the third magnet 103.

The first accommodation hole 8a may be slightly inclined with respect to the radial direction. For example, the angular width between the outer end in the radial direction of the first accommodation hole 8a and the outer end in the radial direction of the second accommodation hole 82 is different from the angular width between the outer end in the radial direction of the first accommodation hole 8a and the outer end in the radial direction of the third accommodation hole 83. The first magnet 9 accommodated in the first accommodation hole may be slightly inclined with respect to the radial direction.

The second accommodation hole 82 and the third accommodation hole 83 of the V-shaped accommodation hole 8b are not limited to be symmetrical with respect to the second center line L2 extending in the radial direction, but may be asymmetrical. For example, the angular width between the top portion 8g of the V-shaped accommodation hole 8b and the outer end in the radial direction of the second accommodation hole 82 is different from the angular width between the top portion 8g and the outer end in the radial direction of the third accommodation hole 83. The size of the second magnet 102 accommodated in the second accommodation hole 82 may be different from the size of the third magnet 103 accommodated in the third accommodation hole 83.

Figure 29:
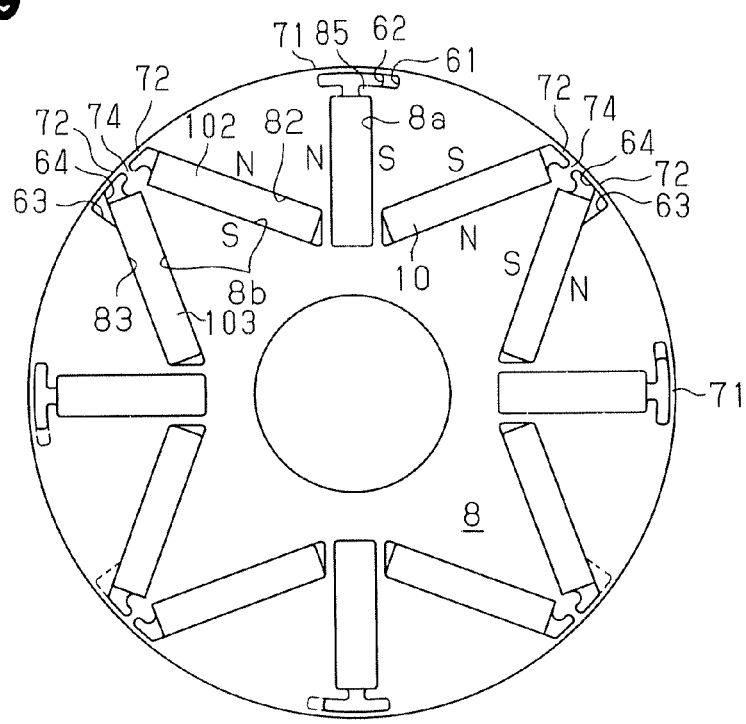
FIG. 29 is a plan view of a rotor of another modification of the motor in FIG. 5.

As shown in FIG. 29, the top portion 8g of the V-shaped accommodation hole 8b may be deleted from the rotor core 8 shown in FIG. 5. In other words, the second accommodation hole 82 and the third accommodation hole 83 do not need to connected with each other, but may be independently defined. The bridge 74 between the accommodation portions extending in the radial direction is defined between the outer end in the radial direction of the second accommodation hole 82 and the outer end in the radial direction of the third accommodation hole 83.

In this case, the second outer bridge 72 is defined between the second accommodation hole 82 and the outer circumferential surface of the rotor core 8. The second outer bridge 72 is defined between the third accommodation hole 83 and the outer circumferential surface of the rotor core 8. Each of the second outer bridges 72 is connected to the bridge 74 between the accommodation portions. In this case, the strength of the rotor core 8 is increased, for example, in comparison with the V-shaped accommodation hole 8b having the top portion 8g, and the deformation of the rotor core 8 is readily prevented.

In the case of FIG. 5, all the first non-uniform portions 61 and the first uniform portions 62 in the outer end in the radial direction of the first accommodation holes 8a correspond to the large-width portions with respect to the first magnets 9. However, the structure may be made such that some of the first non-uniform portions 61 and the first uniform portions 62 correspond to the large-width portions, and the other of the first non-uniform portions 61 and the first uniform portions 62 have a width equal to or less than the width of the first magnet 9. For example, the structure may be made such that only the first non-uniform portions 61 correspond to the large-width portion, and the width of the first uniform portions 62 is equal to that of the first magnet 9. Further, the widths of all the first non-uniform portions 61 and the first uniform portions 62 may be equal to or less than the width of the first magnet 9.

Figure 30:
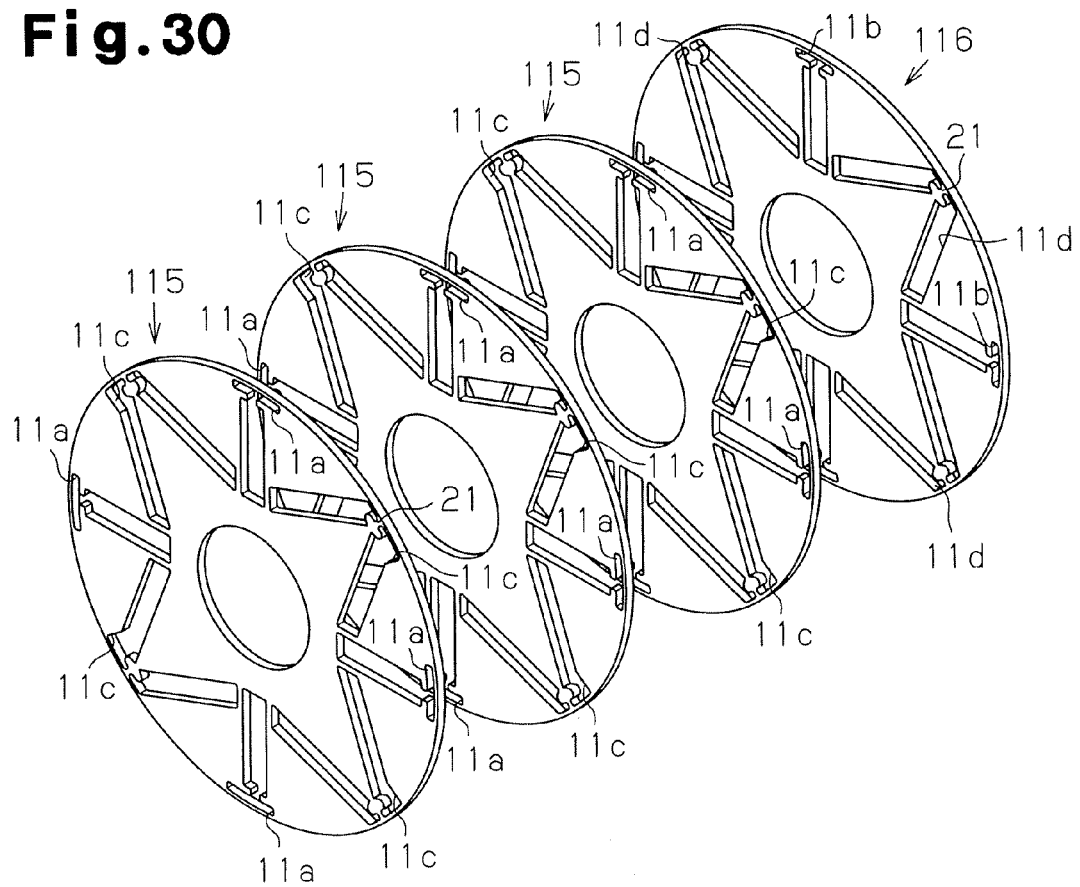
FIG. 30 is an exploded perspective view of a rotor core including a plurality of core sheets in FIG. 29.

The first pre-uniform portion 11b and the second pre-uniform portion lid shown in FIG. 27 may be deleted. The first core sheet 115 shown in FIG. 30 is provided only with the first pre-non-uniform portion 11a and the second pre-non-uniform portion 11c. The second core sheet 116 shown in FIG. 30 has only the first pre-uniform portion 11b and the second pre-uniform portion 11d, and the first pre-non-uniform portion 11a and the second pre-non-uniform portion 11c are deleted. The rotor core 8 may be formed by laminating three first core sheets 111 on one second core sheet 112.

In FIG. 30, a ratio between the number of the first core sheet 115 and the number of the second core sheet 116 is three to one. The ratio may be changed, for example, to one to one, three to two, or nine to one. It is possible to easily and freely select the cross sectional areas of the first non-uniform portion 61, the second non-uniform portion 63, the first uniform portion 62 and the second uniform portion 64, by changing the ratio of the numbers between the first core sheet 115 and the second core sheet 116.

In other words, it is possible to easily adjust the ratio of the first non-uniform portion 61, the second non-uniform portion 63, the first uniform portion 62 and the second uniform portion 64 with respect to the axial direction of the rotor core 8. A torque-torque ripple characteristic of the motor varies in correspondence to the ratio mentioned above. For example, it is possible to widely reduce the torque ripple at a time of the low torque by increasing the ratio in the axial direction of the first non-uniform portion 61 and the second non-uniform portion 63.

Figure 31:
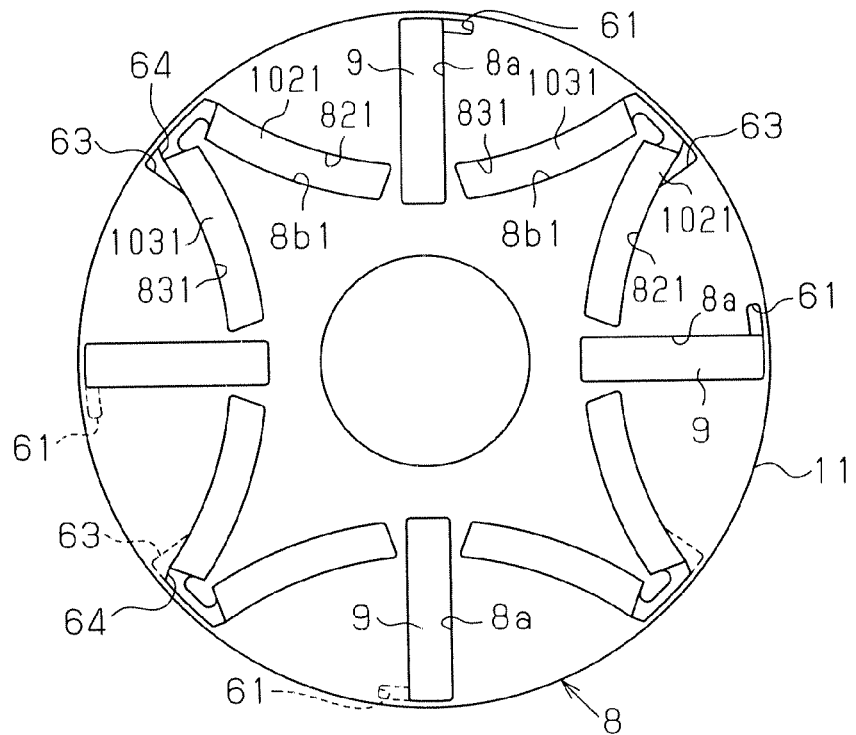
FIG. 31 is a plan view of a core sheet of another modification.

As shown in FIG. 31, the second accommodation hole 821 and the third accommodation hole 831 in the V-shaped accommodation hole 8b1 may be formed in such a shape that the center portions are curved in the direction of approaching each other as seen from the axial direction. In FIG. 31, the first non-uniform portion 61 in the outer end in the radial direction of the first accommodation hole 8a corresponds to the large-width portion.

Figure 9:
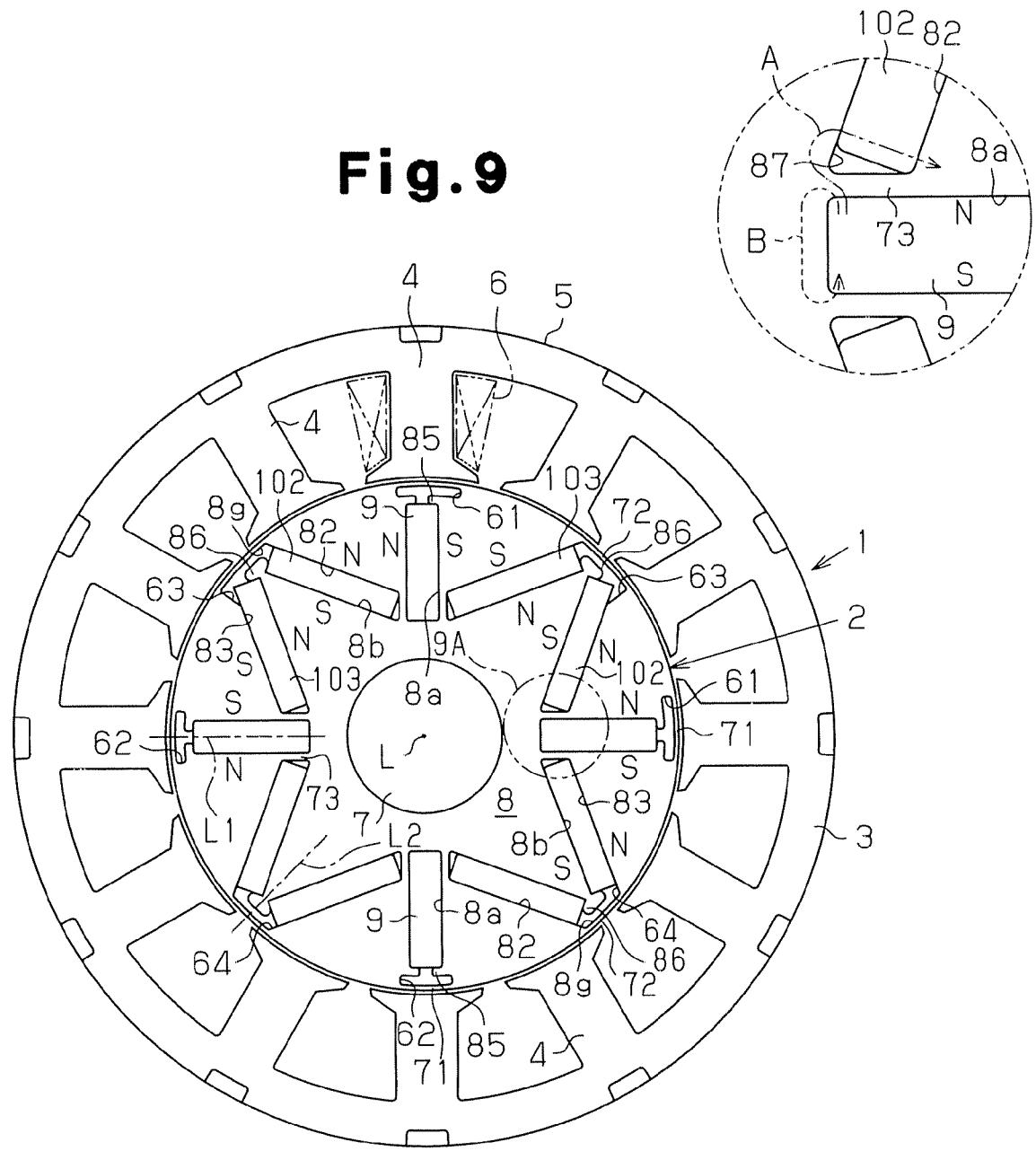
FIG. 9 is a plan view of an embedded magnet type motor in accordance with a fourth embodiment of the present invention.
Figure 32:
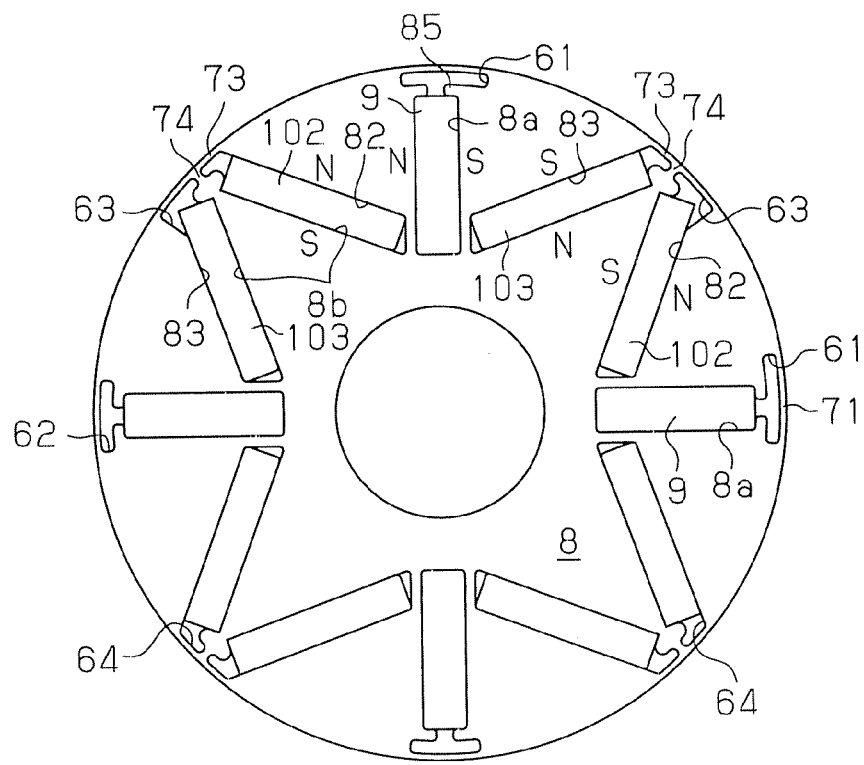
FIG. 32 is a plan view of a rotor of another modification of the motor in FIG. 9.

As shown in FIG. 32, the top portion 8g of the V-shaped accommodation hole 8b may be deleted from the rotor core 8 in FIG. 9. In the same manner as the rotor core 8 shown in FIG. 29, each of the second outer bridges 72 is connected to the bridge 74 between the accommodation portions. Accordingly, the strength of the rotor core 8 is increased, for example, in comparison with the V-shaped accommodation hole 8b having the top portion 8g, and the deformation of the rotor core 8 is readily prevented.

Figure 33:
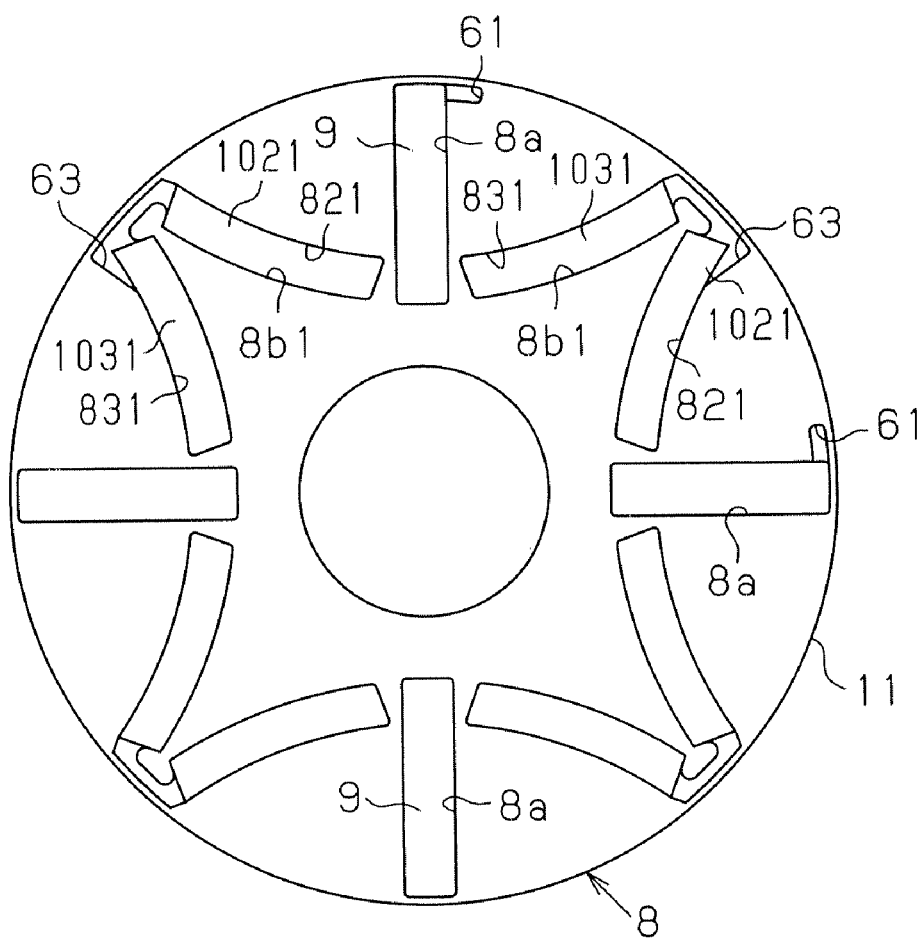
FIG. 33 is a plan view of a rotor of another modification.

As shown in FIG. 33, the second accommodation hole 821 and the third accommodation hole 831 in the V-shaped accommodation hole 8b1 may be curved in such a manner that the center portions approach each other. In the case of FIG. 33, the first non-uniform portion 61 in the outer end in the radial direction of the first accommodation hole 8a corresponds to the large-width portion.

In the embodiment mentioned above, the first non-uniform portion 61 may be formed in two first accommodation holes 8a which are not continuously provided in the circumferential direction, among four first accommodation holes 8a. The first non-uniform portion 61 may be formed in all the first accommodation holes 8a. The second non-uniform portion 63 may be formed in two V-shaped accommodation holes 8b which are not continuously provided in the circumferential direction, or the second non-uniform portion 63 may be formed in all the V-shaped accommodation holes 8b.

Figure 34:
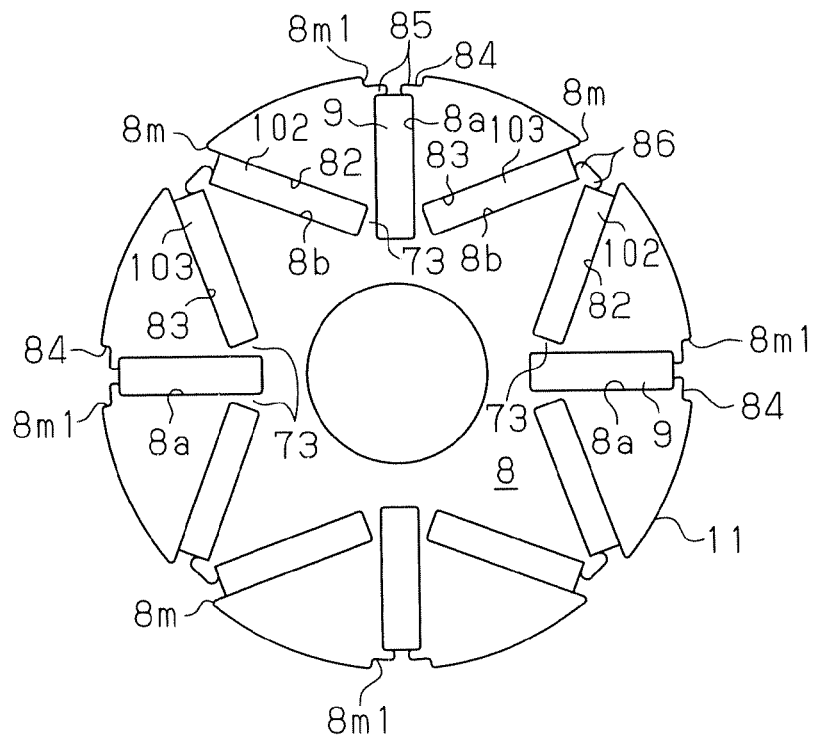
FIG. 34 is a plan view of a rotor of another modification.

As shown in FIG. 34, all the first outer bridges 71 and all the second outer bridges 72 may be deleted in the rotor core 8 in FIG. 3 having the large-width portions 84. In other words, the large-width portion 84 in the outer end in the radial direction of the first accommodation hole 8a may be left open to the outer periphery of the rotor core 8. An opening corresponding to the large-width portion 84 is referred to as an outer circumferential segmentation portion 8m1.

In other words, it is possible to make a density in the axial direction of the portion of the rotor core 8 corresponding to at least one of the first outer bridge 71, the second outer bridge 72 and the inner bridge 73 smaller than the density in the axial direction of the other portions of the rotor core 8, in the rotor core 8 provided with the large-width portion 84.

Figure 35:
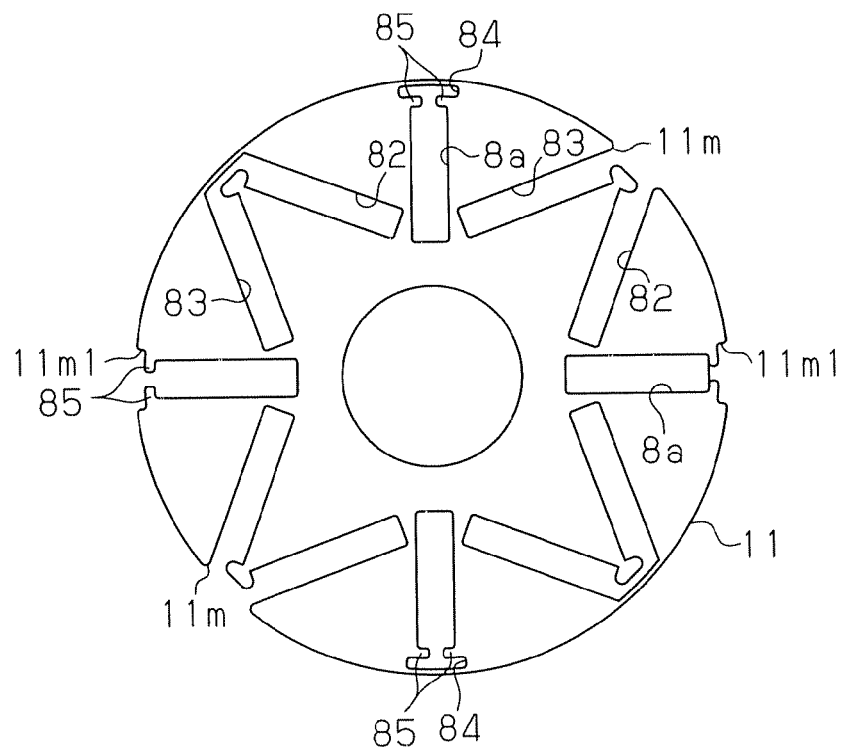
FIG. 35 is a plan view of a core sheet of another modification.

As shown in FIG. 35, the pre-outer circumferential segmentation portion 11m1 may be formed by deleting two first outer bridges 71 away from each other by 180 degrees in four first outer bridges 71, in the core sheet 11 having the large-width portion 84. Further, two pre-outer circumferential segmentation portions 11m may be formed by deleting two second outer bridges 72 away from each other by 180 degrees, in four second outer bridges 72.

Figure 36A:
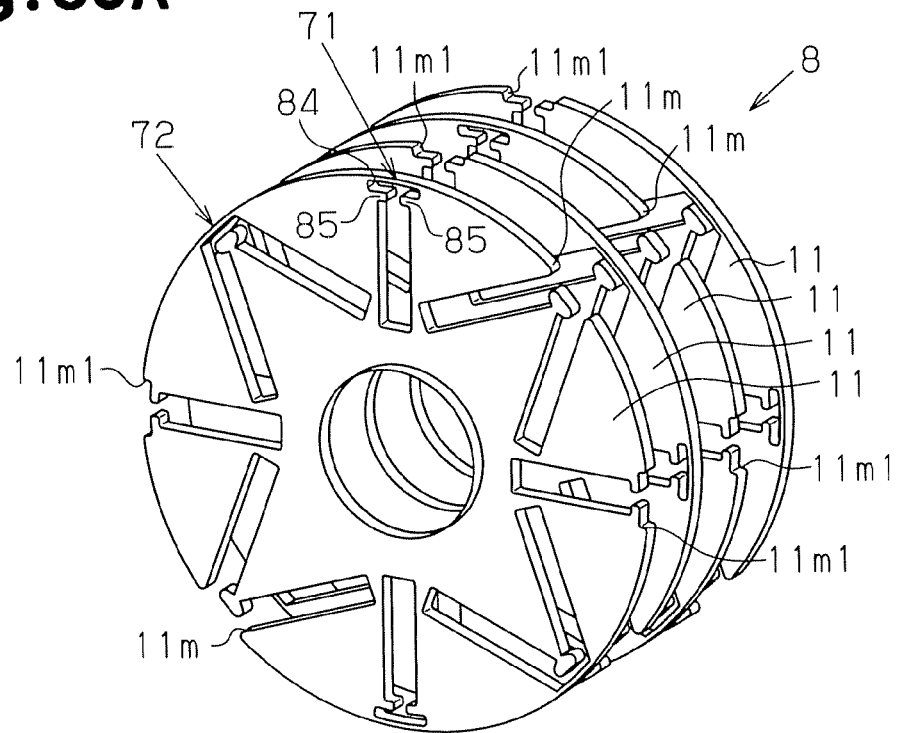
FIG. 36A is an exploded perspective view of a rotor core including a plurality of core sheets in FIG. 35.
Figure 36B:
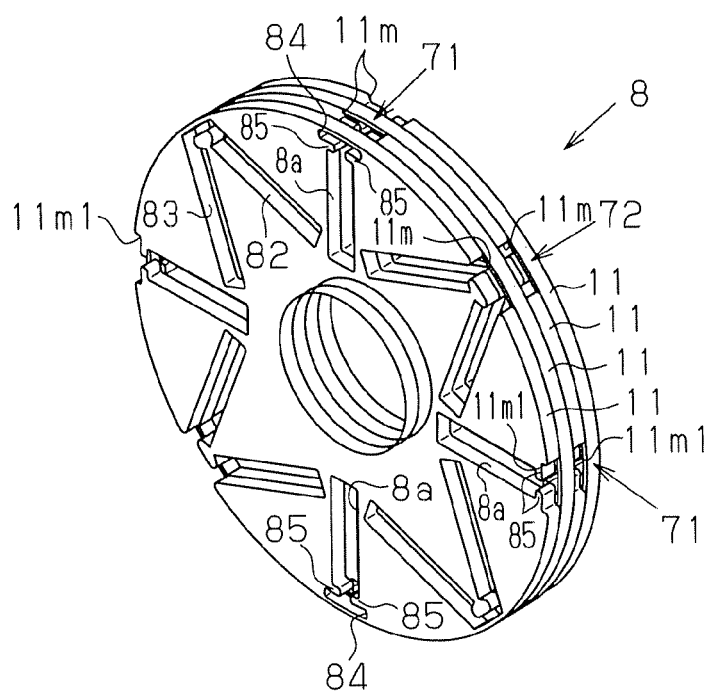
FIG. 36B is a perspective view of the rotor core in FIG. 35A.

As shown in FIGS. 36A and 36B, the rotor core 8 may be manufactured by laminating the core sheets 11 in FIG. 35 while rotating each of them around the center axis by 90 degrees. The rotor core 8 in FIG. 36B has the large-width portion 84, and the uniformly distributed pre-outer circumferential segmentation portions 11m and 11m1.

In this case, the density in the axial direction of the portion of the rotor core 8 corresponding to the first outer bridge 71 and the second outer bridge 72 is smaller than the density in the other portions of the rotor core 8. Accordingly, it is possible to further reduce the leakage flux.

Figure 37:
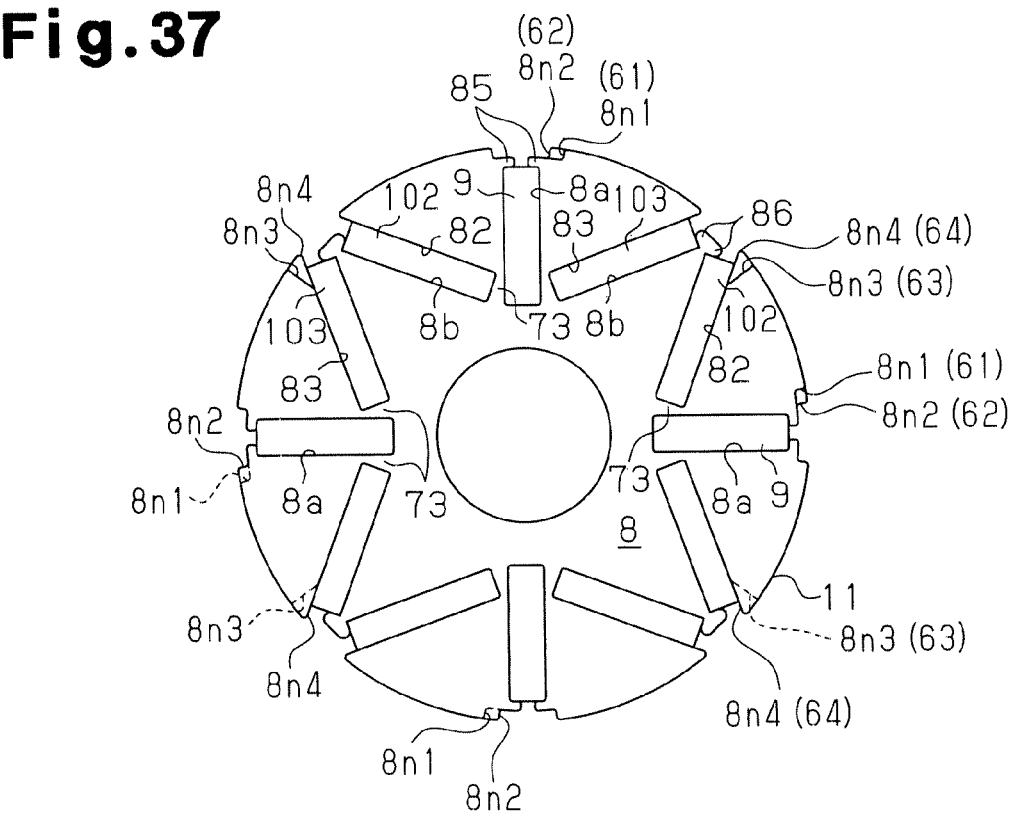
FIG. 37 is a plan view of a rotor of another modification.

As shown in FIG. 37, in the rotor core 8 in FIG. 5 having the first non-uniform portion 61 and the second non-uniform portion 63, the first outer bridge 71 and the second outer bridge 72 may be deleted. An opening formed by leaving the first non-uniform portion 61 open to the outer periphery of the rotor core 8 is referred to as a first non-uniform segmentation portion 8n2, and an opening formed by leaving the first uniform portion 62 open to the outer periphery of the rotor core 8 is referred to as a first uniform segmentation portion 8n2. An opening formed by leaving the second non-uniform portion 63 open to the outer periphery of the rotor core 8 is referred to as a second non-uniform segmentation portion 8n3, and an opening formed by leaving the second uniform portion 64 open to the outer periphery of the rotor core 8 is referred to as a second uniform segmentation portion 8n4.

In other words, in the rotor core 8 provided with the first non-uniform portion 61 and the second non-uniform portion 63, it is possible to make the density with respect to the axial direction of the portion of the rotor core 8 corresponding to at least one of the first outer bridge 71, the second outer bridge 72, and the inner bridge 73 smaller than the density with respect to the axial direction of the other portions of the rotor core 8.

Figure 38:
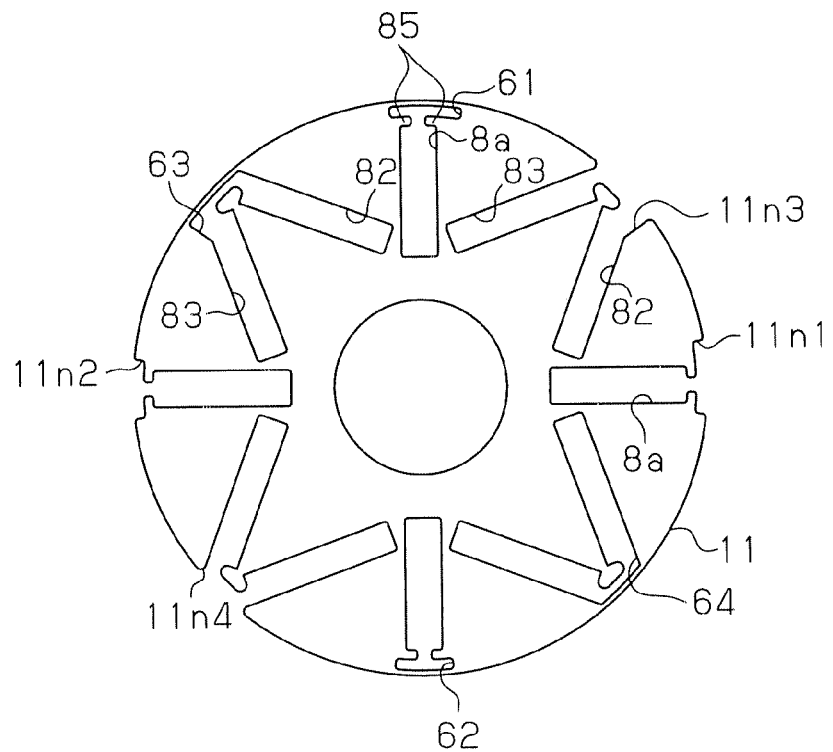
FIG. 38 is a plan view of a core sheet of another modification.

As shown in FIG. 38, in the core sheet 11 having the first non-uniform portion 61 and the second non-uniform portion 63, it is possible to form a first pre-non-uniform segmentation portion 11n1 corresponding to the first non-uniform uniform segmentation portion 8n1, and a first pre-uniform segmentation portion 11n2 corresponding to the first uniform segmentation portion 8n2, by deleting two first outer bridges 71 which are away from each other by 180 degrees, in four first outer bridges 71. Further, it is possible to form a second pre-non-uniform segmentation portion 11n3 corresponding to the second non-uniform segmentation portion 8n3, and a second pre-uniform segmentation portion 11n4 corresponding to the second uniform segmentation portion 8n4, by deleting two second outer bridges 72 which are away from each other by 180 degrees, in four second outer bridges 72.

Figure 39A:
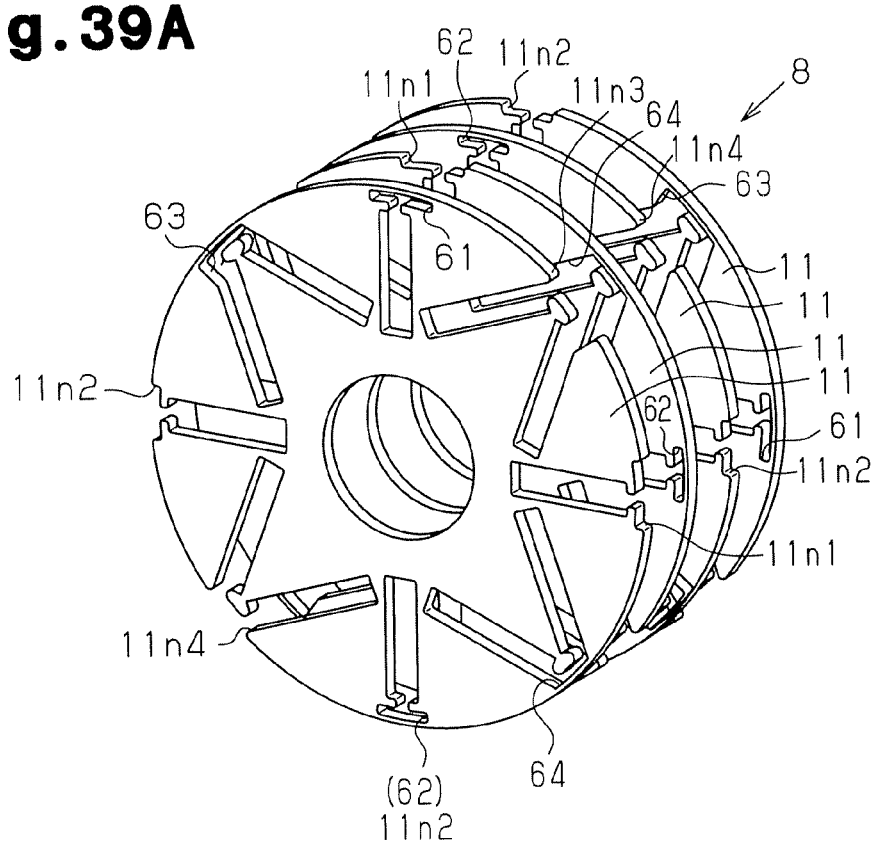
FIG. 39A is an exploded perspective view of a rotor core including a plurality of core sheets in FIG. 38.
Figure 39B:
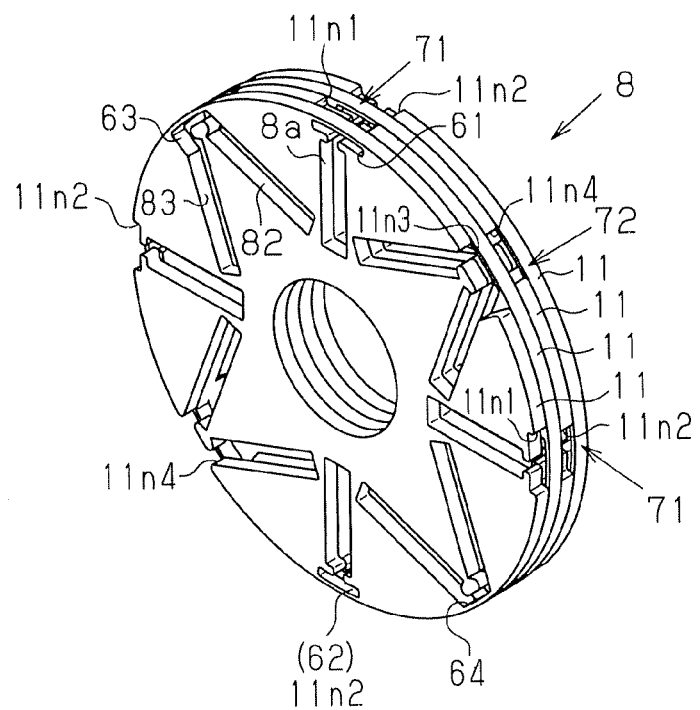
FIG. 39B is a perspective view of the rotor core in FIG. 38A.

As shown in FIGS. 39A and 39B, the rotor core 8 may be manufactured by laminating the core sheets 11 in FIG. 38 while rotating each of them by 90 degree around the center axis. The rotor core 8 in FIG. 39B has the first non-uniform portion 61, the first uniform portion 62, the second non-uniform portion 63, the second uniform portion 64, the first pre-non-uniform segmentation portion 11n1, the first pre-uniform segmentation portion 11n2, the second pre-non-uniform segmentation portion 11n3, and the second pre-uniform segmentation portion 11n4, which are distributed uniformly.

In this case, the density with respect to the axial direction of the portion of the rotor core 8 corresponding to the first outer bridge 71 and the second outer bridge 72 is smaller than the density in the other portions of the rotor core 8. Accordingly, it is possible to further reduce the leakage flux.

Figure 40:
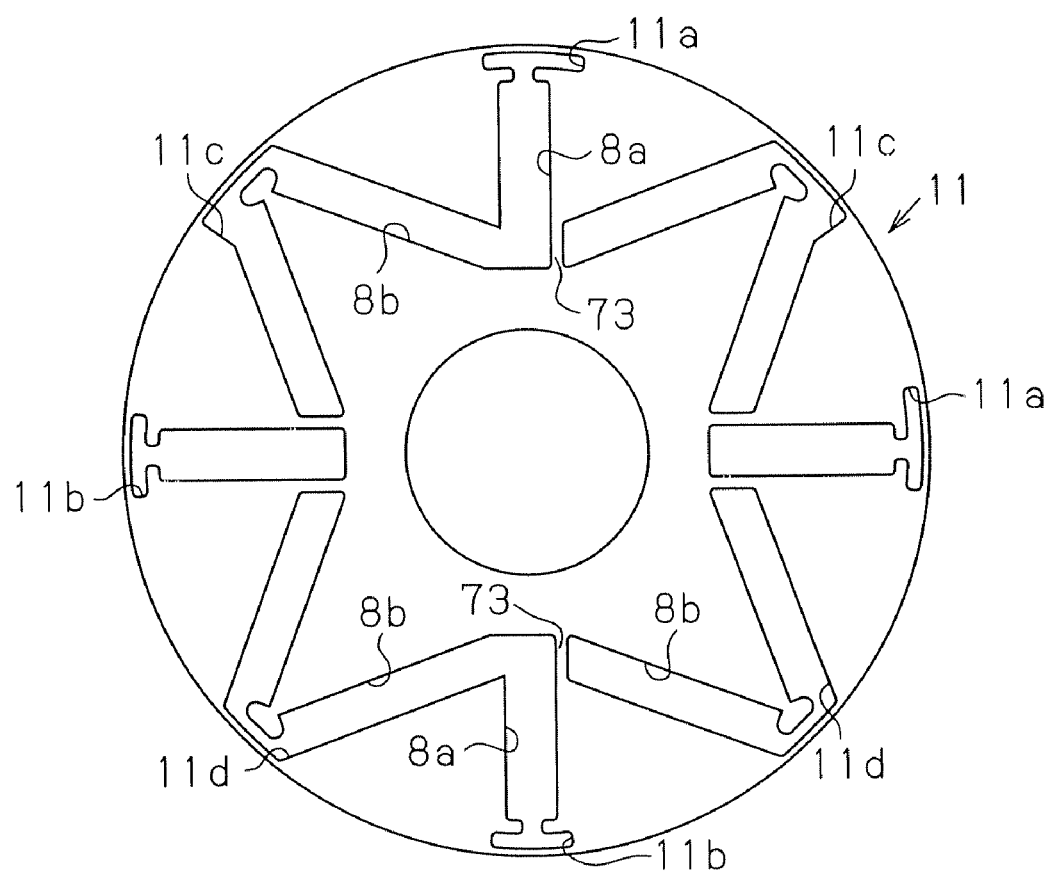
FIG. 40 is a plan view of a core sheet of another modification.

FIG. 40 shows the core sheet 11 obtained by deleting the portion corresponding to the inner bridge 73 positioned between the inner end in the radial direction of the first accommodation hole 8a, and the inner end in the radial direction of the V-shaped accommodation hole 8b. The rotor core 8 may be manufactured by laminating the core sheet 11. In this case, the density with respect to the axial direction of the portion of the rotor core 8 corresponding to the inner bridge 73 is smaller than the density with respect to the axial direction of the other portions of the rotor core 8.

The rotor core 8 is not limited to such a structure that the core sheet 11 is laminated in the axial direction, but may be formed, for example, by a sintered core in which a magnetic powder is sintered.

The number of the teeth 4, the number of the magnetic poles and the number of the first magnet 9 to the third magnet 103 may be changed to other numerical values.

Although the multiple embodiments have been described herein, it will be clear to those skilled in the art that the present invention may be embodied in different specific forms without departing from the spirit of the invention. The invention is not to be limited to the details given herein, but may be modified within the scope and equivalence of the appended claims.

What is claimed is:

1. An embedded magnet type motor comprising:
a rotor having a rotor core having an axis, and a plurality of magnets forming magnetic poles, the number of which is represented by P;
the rotor core having a plurality of accommodation holes arranged over a circumferential direction of the rotor core, the accommodation holes passing through the rotor core along the axial direction;
the plurality of accommodation holes including first accommodation holes, the number of which is represented by P/2, extending in a radial direction of the rotor core, and V-shaped accommodation holes, the number of which is represented by P/2, protruding outward in the radial direction, the first accommodation holes and the V-shaped accommodation holes being alternately arranged in the circumferential direction, each V-shaped accommodation hole having a second accommodation hole and a third accommodation hole corresponding to two straight lines forming the V shape, and each first accommodation hole being adjacent to one of the second accommodation holes at one side in the circumferential direction and being adjacent to one of third accommodation holes in the other; and
the plurality of magnets including first magnets each arranged in one of the first accommodation holes1 second magnets each arranged in one of the second accommodation holes, and third magnets each arranged in one of the third accommodation holes, each first magnet and each second magnet forming one of the magnetic pole, and each first magnet and each third magnets forming another the magnetic pole,
wherein at least one of an outer end in the radial direction and an inner end in the radial direction of each first accommodation hole has a large-width portion corresponding to a space which is formed in at least a part of the rotor core with respect to the axial direction, the large-width portion has a width corresponding to a dimension in a direction perpendicular to an extending direction of the first accommodation hole as seen from the axial direction, and the width of the large-width portion is larger than a width of the first magnet,
wherein the motor is provided with a stator arranged in an outer side in the radial direction of the rotor, the stator is provided with a plurality of teeth extending to an inner side in the radial direction, and the coil is wound around the teeth, and
wherein an angular width between an outer end in the radial direction of each first accommodation hole and an outer end in the radial direction of the associated V-shaped accommodation hole is larger than an angular width of an inner end in the radial direction of the teeth.

2. The motor according to claim 1, wherein each first accommodation hole has a width corresponding to a dimension in a direction perpendicular to a direction in which the first accommodation hole extend5 as seen from the axial direction, and the width is constant over the radial direction, and
wherein each first magnet is formed in a rectangular parallelepiped shape.

3. The motor according to claim 1, wherein each first accommodation hole is formed in a trapezoidal shape as seen from an axial direction, the trapezoidal shape has a width corresponding to a dimension in a direction perpendicular to a direction in which the first accommodation hole extends as seen from the axial direction, and the width is smaller toward an outer side in a radial direction, and
wherein each first magnet is formed in a trapezoidal shape having a width smaller, toward an outer side in the radial direction, and a width of an outer end in the radial direction of the first magnet is larger than a width of an outer end in the radial direction of the first accommodation hole, in a state in which the first magnet is disengaged from the first accommodation hole.

4. The motor according to claim 3, further comprising non-magnetic parts each accommodated in one of the first accommodation holes, wherein each non-magnetic part urges the associated first magnet outward in the radial direction.

5. The motor according to claim 1, wherein each first accommodation hole is formed in a trapezoidal shape as seen from an axial direction, the trapezoidal shape has a width corresponding to a dimension in a direction perpendicular to a direction in which the first accommodation hole extends as seen from the axial direction, arid the width is larger toward an outer side in a radial direction, and
wherein each first magnet is formed in a trapezoidal shape having a width larger toward an outer side in the radial direction, and a width of an inner end in the radial direction of the first magnet is larger than a width of an inner end in the radial direction of the first accommodation hole, in a state in which the first magnet is disengaged from the first accommodation hole.

6. The motor according to claim 5, further comprising non-magnetic parts each accommodated in one of the first accommodation holes, wherein each non-magnetic part urges the associated first magnet to an inner side in the radial direction.

7. The motor according to claim 1, wherein each of the second accommodation holes and the third accommodation holes has a width corresponding to a dimension in a direction perpendicular to an extending direction of the second accommodation hole or the third accommodation hole itself as seen from the axial direction, and the width is constant over the radial direction, and
wherein each of the second magnets and the third magnets is formed in a rectangular parallelepiped shape.

8. The motor according to claim 1, wherein each of the second accommodation holes and the third accommodation holes is formed in a curved shape as seen from the axial direction, and the second magnet and the third magnet are curved.

9. The motor according to claim 1, wherein each V-shaped accommodation hole has a top portion connecting the outer end in the radial direction of the second accommodation hole with the outer end in the radial direction of the third magnet.

10. The motor according to claim 1, wherein each first magnet has a magnetic flux outflow surface from which a magnetic flux flows out and a magnetic flux inflow surface into which the magnetic flux flows, and an inner end in the radial direction of each second accommodation hole faces one of the magnetic flux outflow surface and the magnetic flux inflow surface, and wherein an inner end in the radial direction of each third accommodation hole faces the other of the magnetic flux outflow surface and the magnetic flux inflow surface.

11. The motor according to claim 10, wherein each second accommodation hole and each third accommodation hole extend perpendicularly to the associated first accommodation hole.

12. The motor according to claim 1, wherein the rotor core comprises:

first outer bridges each defined between an outer end in the radial direction of one of the first accommodation holes and an outer circumferential surface of the rotor core;

second outer bridges each defined between an outer end in the radial direction of each of the second accommodation hole and the third accommodation hole, and an outer circumferential surface of the rotor core; and inner bridges each defined between an inner end in the radial direction of each of the second accommodation hole and the third accommodation hole, and the first accommodation hole, and wherein a density with respect to an axial direction of a portion of the rotor core corresponding to at least one of the first outer bridges, the second outer bridges, and the inner bridges is smaller than a density with respect to the axial direction of the other portions of the rotor core.

13. The motor according to claim 12, wherein all of the first outer bridges and all of the second outer bridges of the rotor core are segmented and removed.

14. The motor according to claim 12, wherein the rotor core has a plurality of core sheets laminated in the axial direction, wherein each core sheet has at least one of a set of pre-outer circumferential segmentation portions provided in some of the outer ends in the radial direction of all the first accommodation holes and the outer ends in the radial direction of all the V-shaped accommodation holes, and a set of pre-inner circumferential segmentation portions provided in some of the inner ends in the radial direction of all the first accommodation holes and the inner ends in the radial direction of all the V-shaped accommodation holes, wherein each pre-outer circumferential segmentation portion has a space segmenting the outer bridge, and the pre-inner circumferential segmentation portion has a space segmenting the inner bridge, and wherein a plurality of the core sheets are laminated in such a manner that the pre-outer circumferential segmentation portions and the pre-inner circumferential segmentation portions are uniformly arranged in the circumferential direction in the rotor core.

15. The motor according to claim 14, wherein a plurality of the core sheets are laminated so as to be shifted in phase.

16. The motor according to claim 15, wherein the core sheets are laminated one by one so as to be shifted in phase.

17. The motor according to claim 15, wherein the rotor cores are laminated so as to be shifted in phase per a plurality of the core sheets.

18. The motor according to claim 14, wherein a plurality of the laminated core sheets include inverted core sheets.

19. The motor according to claim 1, wherein each second accommodation hole and the associated third accommodation hole are defined in such a manner as to be independent from each other, and wherein the rotor core has a bridge defined between an outer end in the radial direction of each second accommodation hole, and an outer end in the radial direction of the associated third accommodation hole, and the bridge extends in the radial direction.

20. The motor according to claim 1, wherein the large-width portion extends over a whole of the rotor core in the axial direction.

21. The motor according to claim 1, wherein the large-width portion occupies a part of the rotor core in the axial direction.

22. The motor according to claim 21, wherein the rotor core includes a first core sheet and a second core sheet laminated with each other, wherein the first core sheet has pre-large-width portions corresponding to the large-width portion, and the second core sheet is provided with a same width portion having the same width as that of the first accommodation hole at a position corresponding to the large-width portion.

23. The motor according to claim 21, wherein the rotor core includes a plurality of laminated core sheets, wherein each core sheet has pre-large-width portions corresponding to some of the large-width portion, and wherein a plurality of the core sheets are laminated in such a manner that the pre-large-width portions are uniformly arranged in the circumferential direction in the rotor core.

24. The motor according to claim 1, wherein the rotor core includes a plurality of laminated core sheets, wherein each large-width portion is positioned in an outer end in the radial direction of the associated first accommodation hole, wherein each core sheet has a pre-non-uniform portions in such a manner as to correspond to some of the large-width portions, and a width of each pre-non-uniform portion is larger than the first accommodation hole, wherein each pre-non-uniform portion has a first end and a second end in an opposite side thereto with respect to the circumferential direction, and a distance from a center in the circumferential direction of the first accommodation hole to the first end is different from a distance from the center in the circumferential direction to the second end, and wherein a plurality of the core sheets are laminated in such a manner that the pre-non-uniform portions are uniformly arranged in the circumferential direction in the rotor core.

25. An embedded magnet type motor comprising:

a rotor having a rotor core having an axis, and a plurality of magnets forming magnetic poles, the number of which is represented by P;

the rotor core having a plurality of accommodation holes arranged over a circumferential direction of the rotor core, the accommodation holes passing through the rotor core along the axial direction;

the plurality of accommodation holes including first accommodation holes, the number of which is represented by P/2, extending in a radial direction of the rotor core, and V-shaped accommodation holes, the number of which is represented by P/2, protruding outward in the radial direction, the first accommodation holes and the V-shaped-accommodation holes being alternately arranged in the circumferential direction, each V-shaped accommodation hole having a second accommodation hole and a third accommodation hole corresponding to two straight lines forming the V shape, and each first accommodation hole being adjacent to one of the second accommodation holes at one side in the circumferential direction and being adjacent to one of third accommodation holes in the other; and the plurality of magnets including first magnets each arranged in one of the first accommodation holes, second magnets each arranged in one of the second accommodation holes, and third magnets each arranged in one of the third accommodation holes, each first magnet and each second magnet forming one of the magnetic pole, and each first magnet and each third magnets forming another the magnetic pole, wherein at least one of an outer end in the radial direction and an inner end in the radial direction of each first accommodation hole has a large-width portion corresponding to a space which is formed in at least a part—of the rotor core with respect to the axial direction, the large-width portion has a width corresponding to a dimension in a direction perpendicular to an extending direction of the first accommodation hole as seen from the axial direction, and the width of the large-width portion is larger than a width of the first magnet, wherein the motor is provided with a stator arranged in an outer side in the radial direction of the rotor, the stator is provided with a plurality of teeth extending to an inner side in the radial direction, and the winding is wound around the teeth, wherein each large-width portion is positioned in an outer end in the radial direction of the first accommodation hole, and wherein an angular width of each large-width portion is smaller than an angular width of an inner end in the radial direction of the teeth.

26. An embedded magnet type motor comprising:

a rotor having a rotor core having an axis, and a plurality of magnets forming magnetic poles, the number of which is represented by P;

the rotor core having a plurality of accommodation holes arranged over a circumferential direction of the rotor core, the accommodation holes passing through the rotor core along the axial direction;

the plurality of accommodation holes including first accommodation holes, the number of which is represented by P/2, extending in a radial direction of the rotor core, and V-shaped accommodation holes, the number of which is represented by P/2, protruding outward in the radial direction, the first accommodation holes and the V-shaped accommodation holes being alternately arranged in the circumferential direction, each V-shaped accommodation hole having a second accommodation hole and a third accommodation hole corresponding to two straight lines forming the V shape, and each first accommodation hole being adjacent to one of the second accommodation holes at one side in the circumferential direction and being adjacent to one of third accommodation holes in the other; and the plurality of magnets including first magnets each arranged in one of the first accommodation holes, second magnets each arranged in one of the second accommodation holes, and third magnets each arranged in one of the third accommodation holes, each first magnet and each second magnet forming one of the magnetic pole, and each first magnet and each third magnets forming another the magnetic pole, wherein at least one of an outer end in the radial direction and an inner end in the radial direction of each first accommodation hole has a large-width portion corresponding to a space which is formed in at least a part of the rotor core with respect to the axial direction, the large-width portion has a width corresponding to a dimension in a direction perpendicular to an extending direction of the first accommodation hole as seen from the axial direction, and the width of the large-width portion is larger than a width of the first magnet, wherein each large-width portion is positioned in an outer end in the radial direction of one of the first accommodation holes, and wherein an angular width of the large-width portion is equal to an angular width of an outer end in the radial direction of each V-shaped accommodation hole.

27. An embedded magnet type motor comprising:

a. rotor having a rotor core having an axis, and a plurality of magnets forming magnetic poles, the number of which is represented by P;

the rotor core having a plurality of accommodation holes arranged over a circumferential direction of the rotor core, the accommodation holes passing through the rotor core along the axial direction;

the plurality of accommodation holes including first accommodation holes, the number of which is represented by P/2, extending in a radial direction of the rotor core, and V-shaped accommodation holes, the number of which is represented by P/2, protruding outward in the radial direction, the first accommodation holes and the V-shaped accommodation holes being alternately arranged in the circumferential direction, each V-shaped accommodation hole having a second accommodation hole arid a third accommodation hole corresponding to two straight lines forming the V shape, and each first accommodation hole being adjacent to one of the second accommodation holes at one side in the circumferential direction and being adjacent to one of third accommodation holes in the other; and the plurality of magnets including first magnets each arranged in one of the first accommodation holes, second magnets each arranged in one of the second accommodation holes, and third magnets each arranged in one of the third accommodation holes, each first magnet and each second magnet forming one of the magnetic pole, and each first magnet and each third magnets forming another the magnetic pole, wherein at least one of an outer end in the radial direction and an inner end in the radial direction of each first accommodation hole has a large-width portion corresponding to a space which is formed in at least a part of the rotor core with respect to the axial direction, the large-width portion has a width corresponding to a dimension in a direction perpendicular to an extending direction of the first accommodation hole as seen from the axial direction, and the width of the large-width portion is larger than a width of the first magnet, wherein each first magnet has a magnetic flux outflow surface from which a magnetic flux flows out, and a magnetic flux inflow surface into which the magnetic flux flows, wherein an inner end in the radial direction of each second accommodation hole faces one of the magnetic flux outflow surface arid the magnetic flux inflow surface, wherein an inner end in the radial direction of each third accommodation hole faces the other of the magnetic flux outflow surface and the magnetic flux inflow surface, and wherein an inner bridge is defined between an inner end in the radial direction of each of the second accommodation holes and the third accommodation holes, and the first accommodation holes, and a width of each inner bridge is constant over the radial direction.

28. The motor according to claim 1, wherein the rotor core comprises:
first outer bridges each defined between an outer end in the radial direction of one of the first accommodation holes and an outer circumferential surface of the rotor core;
second outer bridges each defined between an outer end in the radial direction of each of the second accommodation holes and the third accommodation holes, and an outer circumferential surface of the rotor core; and
inner bridges each defined between an inner end in the radial direction of each of the second accommodation holes and the third accommodation holes, and the first accommodation hole, and
wherein a density with respect to an axial direction of a portion of the rotor core corresponding to at least one of the first outer bridges, the second outer bridges, and the inner bridges is smaller than a density with respect to the axial direction of the other portions of the rotor core.

29. The motor according to claim 28, wherein all of the first outer bridges and all of the second outer bridges of the rotor core are segmented and removed.

30. The motor according to claim 28, wherein the rotor core has a plurality of core sheets laminated in the axial direction, wherein each core sheet has at least one of a set of pre-outer circumferential segmentation portions provided in some of the outer ends in the radial direction of all of the first accommodation holes and the outer ends in the radial direction of all the V-shaped accommodation holes, and a set of pre-inner circumferential segmentation portions provided in some of the inner ends in the radial direction of all the first accommodation hole and the inner ends in the radial direction of all the V-shaped accommodation holes,
wherein each pre-outer circumferential segmentation portion has a space segmenting the associated outer bridge, and each pre-inner circumferential segmentation portion has a space segmenting the associated inner bridge, and
wherein a plurality of the core sheets are laminated in such a manner that the pre-outer circumferential segmentation portions and the pre-inner circumferential segmentation portions are uniformly arranged in the circumferential direction in the rotor core.

31. The motor according to claim 1, wherein the rotor core has a non-uniform portion provided in each of an outer end in the radial direction of each first accommodation hole and an outer end in each radial direction of the V-shaped accommodation hole, and
wherein each non-uniform portion has a first end and a second end in an opposite side thereto with respect to a circumferential direction, and a distance from a center in the circumferential direction of the first accommodation hole or the V-shaped accommodation hole corresponding thereto to the first end is different from a distance from the center in the circumferential direction to the second end.

32. The motor according to claim 31, wherein the outer end in the radial direction of at least one of the first accommodation holes has a large-width portion which is formed in at least a part of the rotor core with respect to the axial direction, the large-width portion has a. width corresponding to a dimension in a direction perpendicular to an extending direction of the first accommodation hole as seen from the axial direction, and the width of the large-width portion is larger than a width of the first magnet.

33. The motor according to claim 32, wherein the non-uniform portion doubles as the large-width portion.

34. The motor according to claim 32, wherein the outer ends in the radial direction of all of the first accommodation holes each have the large-width portion.

35. The motor according to claim 31, wherein the rotor core includes a plurality of laminated core sheets,
wherein each core sheet has pre-non-uniform portions corresponding to some of the first accommodation holes, and
wherein a plurality of the core sheets are laminated in such a manner that the pre-non-uniform portions are uniformly arranged in the circumferential direction in the rotor core.

36. The motor according to claim 31, wherein the rotor core includes a plurality of laminated core sheets, and the core sheets comprise at least:
a first core sheet having pre-non-uniform portions corresponding to the non-uniform portions of the first accommodation holes; and
a second core sheet having uniform portions provided at a position corresponding to the pre-non-uniform portions, and
wherein each uniform portion has a first end and a second end in an opposite side thereto with respect to the circumferential direction, and a distance from the center in the circumferential direction to the first end is equal to a distance from the center in the circumferential direction to the second end.

37. The motor according to claim 31, wherein the non-uniform portion is uniformly formed in the rotor core over the axial direction.

38. The motor according to claim 37, wherein the outer end in the radial direction of at least one the first accommodation holes has a large-width portion formed in at least a part of the rotor core with respect to the axial direction, the large-width portion has a width corresponding to a dimension in a direction perpendicular to an extending direction of the first accommodation hole as seen from the axial direction, and the width of the large-width portion is larger than a width of the first magnet.

39. The motor according to claim 31, wherein the rotor core comprises:
first outer bridges each defined between an outer end in the radial direction of one of the first accommodation holes, and an outer circumferential surface of the rotor core;
second outer bridges each defined between an outer end in the radial direction of each of the second accommodation holes and the third accommodation holes, and the outer circumferential surface of the rotor core, and
inner bridges each defined between an inner end in the radial direction of each of the second accommodation holes and the third accommodation holes, and the first accommodation hole, and
wherein a density with respect to the axial direction of the portion of the rotor core corresponding to at least one of the first outer bridges, the second outer bridges, and the inner bridges is smaller than a density with respect to the axial direction of the other portions of the rotor core.

* * * * *